(12) United States Patent
Iwamura et al.

(10) Patent No.: US 7,786,182 B2
(45) Date of Patent: Aug. 31, 2010

(54) METHOD FOR PRODUCTION OF WATER ABSORBING AGENT

(75) Inventors: Taku Iwamura, Hyogo (JP); Yoshiro Mitsukami, Hyogo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 12/065,922

(22) PCT Filed: Sep. 15, 2006

(86) PCT No.: PCT/JP2006/318805
§ 371 (c)(1),
(2), (4) Date: Mar. 6, 2008

(87) PCT Pub. No.: WO2007/032565
PCT Pub. Date: Mar. 22, 2007

(65) Prior Publication Data
US 2009/0163360 A1    Jun. 25, 2009

(30) Foreign Application Priority Data
Sep. 16, 2005   (JP) .............................. 2005-270761

(51) Int. Cl.
B29C 71/04    (2006.01)
C08F 290/14   (2006.01)
C08G 18/62    (2006.01)
(52) U.S. Cl. ............................. 522/71; 522/84; 524/832
(58) Field of Classification Search .................. 522/71, 522/84, 133, 129; 524/804, 832
See application file for complete search history.

(56) References Cited

U.S. PATENT DOCUMENTS

| | | | |
|---|---|---|---|
| 4,666,983 A | 5/1987 | Tsubakimoto et al. | |
| 4,783,510 A | 11/1988 | Saotome | |
| 4,910,250 A | 3/1990 | Saotome | |
| 4,970,267 A | 11/1990 | Bailey et al. | |
| 5,422,405 A | 6/1995 | Dairoku et al. | |
| 6,927,268 B2 * | 8/2005 | Matsumoto et al. | 526/317.1 |
| 2004/0143030 A1 | 7/2004 | Ikkai | |
| 2005/0048221 A1 | 3/2005 | Irie et al. | |
| 2006/0073969 A1 | 4/2006 | Torii et al. | |

FOREIGN PATENT DOCUMENTS

| EP | 0287970 | 10/1988 |
|---|---|---|
| EP | 1 504 774 | 2/2005 |
| EP | 1773896 | 1/2006 |
| EP | 1 669 394 | 6/2006 |
| EP | 1824910 | 6/2006 |
| EP | 1838766 | 6/2006 |
| JP | A-60-032830 | 2/1985 |
| JP | A-63-043930 | 2/1988 |
| JP | A-63-260907 | 10/1988 |
| JP | A-2-091129 | 3/1990 |
| JP | A-6-200046 | 7/1994 |
| JP | A-8-27278 | 1/1996 |
| JP | A-8-134134 | 5/1996 |
| JP | A-10-298215 | 11/1998 |
| JP | A-11-035612 | 2/1999 |
| JP | A-2004-99789 | 4/2004 |
| JP | A-2004-261797 | 9/2004 |
| JP | 2005097585 A * | 4/2005 |
| JP | A-2005-97585 | 4/2005 |
| JP | A-2005-226042 | 8/2005 |
| WO | WO2004/031253 | 4/2004 |
| WO | WO 2004069915 A2 * | 8/2004 |
| WO | WO2006/007997 | 1/2006 |
| WO | WO2006/062253 | 6/2006 |
| WO | WO2006/062258 | 6/2006 |

OTHER PUBLICATIONS

English Translation of JP 2005097585 A, Irie et al, Apr. 2005.*
Chawla et al., "Electron Spin Resonance and Pulse Radiolysis Studies of Some Reactions of SO4," *The Journal of Physical Chemistry*, vol. 79, No. 24, pp. 2693-2700 (1975).
Tang et al., "Kinetics and Spectroscopy of the SO4- Radical in Aqueous Solution," *Journal of Photochemistry and Photobiology, A: Chemistry*, vol. 44, pp. 243-258 (1988).
International Preliminary Report on Patentability, International Application No. PCT/JP2006/318805 mailed on Mar. 27, 2008.
European Search Report issued in Application No. 06810417.1-1217, Apr. 7, 2010, Europe.

* cited by examiner

Primary Examiner—Vasu Jagannathan
Assistant Examiner—Karuna P Reddy
(74) Attorney, Agent, or Firm—Occhiuti Rohlicek & Tsao LLP (57) ABSTRACT

The present invention provides a method for producing a water absorbing agent which excels in water absorption properties. In detail, the present invention provides a method for the production of a water absorbing agent, comprising a) a step of mixing a water absorbing resin, water, and a mixing aid without adding a water-soluble radical polymerization initiator and an ethylenically unsaturated monomer and b) a step of irradiating the resultant mixture with ultraviolet rays while keeping the mixture with flowed state.

21 Claims, 2 Drawing Sheets

METHOD FOR PRODUCTION OF WATER ABSORBING AGENT

CROSS-REFERENCE TO RELATED APPLICATIONS

This application is being filed as a U.S. National Stage under 35 U.S.C. 371 of International Application No. PCT/JP2006/318805, filed Sep. 15, 2006, which claims the benefit of Japanese Application Ser. No. 2005-270761, filed Sep. 16, 2005. The contents of the prior applications are hereby incorporated by reference in their entirety.

TECHNICAL FIELD

This invention relates to a method for the production of a water absorbing agent and more particularly to a method for producing a water absorbing agent by mixing a water absorbing resin, water and a mixing aid without adding a water-soluble radical polymerization initiator and an ethylenically unsaturated monomer, and irradiating the resultant mixture with ultraviolet rays while keeping the mixture with flowed state. Incidentally, the term "water absorbing agent" as used in this invention is referred to as a product resulting from modifying (cross-linking) the surface of a water absorbing resin.

BACKGROUND ART

The water absorbent resin has been hitherto used as one component for hygienic materials such as sanitary cotton, disposable diaper, and absorbents for other kinds of body fluid. As concrete examples of the water absorbent resin, hydrolyzate of starch-acrylonitrile graft polymer, neutralized starch-acrylic acid graft polymer, saponified vinyl acetate-acrylic acid ester copolymer, hydrolyzate of acrylonitrile copolymer or acrylamide copolymer, and the product of cross-linkage thereof, and partially neutralized cross-linked acrylic acid may be cited. These water absorbent resins invariably possess an internal cross-linked structure and exhibit no solubility in water.

The characteristic properties which these water absorbent resins are expected to possess include high absorption capacity against no pressure and against pressure, excellent absorption speed, high gel strength, and fully satisfactory suction force necessary for sucking water from a medium, for example. Since the water absorbing properties are affected by crosslink density, they do not necessarily manifest positive correlations with one another as evinced by the fact that an increase in the crosslink density leads to an increase in the gel strength but a decrease in the amount of water absorbed. Particularly, the absorption capacity is in a contradictory relation with the absorption speed, the gel strength, and the suction force, for example. The water absorbent resin which has acquired an enhanced absorption capacity, therefore, possibly shuns uniform absorption of water and forms portions of partial aggregation of itself when the water absorbent resin particles contact with water and induces extreme degradation of the absorption speed because the water is not diffused throughout the entire volumes of water absorbent resin particles.

For the purpose of relaxing this phenomenon and obtaining a water absorbent resin which has a high absorption capacity and a comparatively satisfactory absorption speed, a method for giving the water absorbent resin particles a surface coated with a surfactant or a nonvolatile hydrocarbon has been available. This method indeed exalts the dispersibility of the initially absorbed water but brings no sufficient effects in enhancing the absorption speed and the suction force of the individual resin particles.

As a means to produce a polyacrylic acid type polymer of high water absorbing property, a method which comprises causing an aqueous composition having a partial alkali metal salt of polyacrylic acid as a main component and having a low crosslink density to be heated in the presence of a water-soluble peroxide radical initiating agent thereby introducing a crosslink therein by radical cross-linkage has been proposed (U.S. Pat. No. 4,910,250). It is difficult to distribute uniformly internal cross-links in the polymer and uneasy to adjust the crosslink density. Thus, a measure of preparing a polymer which contains water-soluble polyacrylic acid gel having low crosslink density and then heating the polymer together with a persulfate added thereto as a polymerization initiator is adopted. Patent Document 1 claims to realize precise control of crosslink density by adjusting the amount of the initializing agent to be added and, owing to the uniform presence of crosslink in the polymer, acquire perfect water absorbing properties and obtain as well a water absorbent resin devoid of stickiness.

While the persulfate which is used in the Patent Document 1 mentioned above is decomposed by heat, it is decomposed by ultraviolet rays and generates radicals (J. Phys. Chem., 1975, 79, 2693, and J. Photochem. Photobiol., A, 1988, 44, 243). Since the persulfate fulfills a function as a polymerization initiator, the aqueous solution of a water-soluble vinyl monomer, when exposed to radiation, undergoes polymerization and radical cross-linkage simultaneously and produces a hydrogel (JP-A-2004-99789). A reaction system which forms an internal crosslink by adding a hydrophilic polymer component, a photo-polymerization initiator, and a cross-linking agent together and irradiating them with ultraviolet rays has been known (WO 2004/031253).

Meanwhile, a method which gives a water absorbent resin a surface treatment with a cross-linking agent and imparts thereto a surface of a heightened crosslink density has been also known (U.S. Pat. Nos. 4,666,983 and 5,422,405, for example). Such water absorbent resins as cited in the preceding patent documents entail the presence of a reactive functional group on their surfaces. By effecting introduction of a crosslink between functional groups in consequence of the addition of a surface cross-linking agent capable of reacting with the functional groups, it is made possible to give to the water absorbent resin a surface of increased crosslink density and enable the water absorbent resin to acquire water absorbing properties perfect even under pressure.

Further, since the use of the surface cross-linking agent mentioned above requires the reaction for the formation of cross-links to be performed at a high temperature for a long time and entails the problem of suffering persistence of the cross-linking agent in the unaltered state, a method which, by causing an aqueous solution containing a peroxide radical initiating agent to contact a resin and heating the resin, accomplishes introduction of cross-links into polymer molecular chains in the neighborhood of the surface of the resin by virtue of decomposition of the radical initiating agent has been proposed (U.S. Pat. No. 4,783,510). In a working example of this method, a water absorbent resin exhibiting an exalted absorption capacity was obtained by affecting the heating with superheated steam at 130° C. for 6 minutes.

Further, JP-A-2005-97585 discloses a technique for modifying the surface of the water absorbing resin and enhancing the absorbency against pressure by adding a processing liquid containing a radical polymerizing compound and a particulate water absorbing resin and irradiating the resultant mixture with active energy rays. Since this method uses a radical polymerizing compound, however, it has greatly lowered the absorbency against no pressure and entailed a very high cost.

JP-A-63-260907 discloses a technique for decreasing residual monomer content in a water absorbing resin by irradiating a water absorbing resin having specific water content with ultraviolet rays without adding a radical polymerizing compound. However, this technique does not involve the flow of the water absorbing resin during the irradiation with ultraviolet rays, therefore the modification of the surface of the water absorbing resin was performed extremely unevenly, if any.

DISCLOSURE OF THE INVENTION

The object of introducing a surface cross-link to a water absorbing resin consists in producing a water absorbing resin excelling in the balance between absorbency and absorption speed. Generally, a cross-linking agent possessing at least two functional groups capable of reacting with the functional group existing in the surface of a water absorbing resin is required to react with the water absorbing resin. The cross-linking agents which fulfill this requirement include polyhydric alcohols, polyvalent glycidyl ethers, haloepoxy compounds, polyvalent aldehydes, polyvalent amines, and polyvalent metal salts, for example. Since these cross-linking agents generally are deficient in reactivity, they require the relevant reactions to be performed at elevated temperatures and occasionally placed under application of heat for a long time. Thus, the reactions call for enormous energy and time.

Even in the method for surface treatment disclosed in Patent Document 6 which uses a peroxide radical initiator as a cross-linking agent, the efficient reaction process needs a high temperature and the additional improvement of productivity is also demanded.

Then, the method disclosed in Patent Document 7 suffers a great decrease of the absorbency against no pressure, as well as incurs a high cost owing to the use of a radical polymerizing compound.

Further, the method disclosed in Patent Document 8 is desirable economically in terms that a radical polymerizing compound is not used. However, since the method disclosed in Patent Document 8 does not involve the flow of the water absorbing resin during the irradiation with ultraviolet rays, the modification of a surface of a water absorbing resin is performed extremely unevenly and thus the resultant water absorbing resin has high possibility not to manifest excellent water absorption properties.

In the present state of affairs described above, this invention is aimed at providing a method for producing a water absorbing agent excelling in such water absorption properties as absorbency and absorbing speed against no pressure or against pressure at a low cost with a high efficiency of production.

The present inventors have made a diligent study in search of a method for producing a water absorbing agent resulting from modifying the surface of a water absorbing resin and has consequently discovered that the uniform modification of the surface of a water absorbing resin can be attained by mixing the water absorbing resin and a water in the presence of a mixing aid and irradiating the resultant mixture with ultraviolet rays while keeping the mixture with flowed state. This invention has been perfected as a result.

Moreover, the method of this invention enables a modified surface without either using a surface cross-linking agent which has been an essential component for the conventional method or performing a treatment at a high temperature for a long time and permits the production of a target water absorbing agent exhibiting an exalted absorbency against pressure and excelling in such water absorbing properties as absorbency against pressure at a low cost with a high efficiency of production.

It has been simultaneously found that the water absorbing agent repress decrease of the absorbency against no pressure and excels particularly in the balance of water absorbing properties.

Heretofore, the surface cross-linkage which used a reaction by heating has necessitated a treatment at an elevated temperature as in the range of 100-300° C., depending on the kind of a surface cross-linking agent to be incorporated. This invention permits the surface-modification solely by irradiation with ultraviolet rays and does not always necessitate heat. Furthermore this invention can reduce the energy costs required for the production because this invention can shorten the time of the treatment to a large extent compared with the conventional method.

Since the method of this invention does not use any water-soluble radical polymerization initiator or ethylenically unsaturated monomer which is considered to be activated with ultraviolet rays to induce the formation of surface cross-linkage as well as any surface cross-linking agent reacting by heat, the raw material cost therefor can be decreased.

In respect the material properties, since it does not use any surface cross-linking agent, it can improve only the absorbency of the produced water absorbing agent against pressure considerably without any decrease in the absorbency under no pressure.

Also, the method of this invention can repress the formation of aggregates which are easily occurred at the time of mixing the water absorbing resin and water in the presence of a mixing aid and permit the uniform surface-modification by irradiating the resultant mixture with ultraviolet rays while keeping the mixture in a flowed state.

The other objects, characteristics, and advantages of this invention will be clarified by taking into consideration the following explanation and the preferred modes of embodiment illustrated in the drawings attached hereto.

DETAILED DESCRIPTION OF THE EMBODIMENT

This invention concerns a method for producing a water absorbing agent, comprising a) a step of mixing a water absorbing resin, water, and a mixing acid without adding a water-soluble radical polymerization initiator and an ethylenically unsaturated monomer and b) a step of irradiating the resultant mixture with an ultraviolet rays while keeping the mixture with flowed state.

(a) Water Absorbing Resin

The water absorbing resin usable in this invention is a water-swelling water-insoluble cross-linked polymer capable of forming a hydrogel. The term "water-swelling" as used in this invention refers to the water absorbency against no pressure in an aqueous 0.9 weight % sodium chloride solution (physiological saline water) such that a given sample absorbs essentially at a ratio of not less than 2 g/g, preferably at a ratio in the range of 5-100 g/g and more preferably at a ratio in the range of 10-60 g/g. The term "water-insoluble" refers to the eluted soluble uncross-linked content (the water-soluble polymer compound) in the water absorbing resin which preferably is in the range of 0-50 weight %, more preferably not more than 25 weight %, still more preferably not more than 15 weight %, and particularly preferably not more than 10 weight %. Incidentally, the numerical values of the water absorbency against no pressure and the eluted soluble content are those found by the method of determination specified in the working example to be cited herein below.

This invention, as the water absorbing resin, preferably uses a water absorbing resin which possesses a cross-linked structure obtained by polymerizing an acid group-containing unsaturated monomer from the viewpoint of liquid absorbing properties. Incidentally, as the acid group-containing unsaturated monomer, this invention regards as an acid group-containing unsaturated monomer such a monomer as acrylonitrile which is converted by hydrolysis subsequent to polymerization into an acid group after the polymerization. Preferably, an acid group-containing unsaturated monomer which contains an acid group at the time of polymerization is used.

The water absorbent resin which can be used in this invention does not need to be particularly restricted but is only required to be capable of being obtained by polymerizing a monomer component essentially containing an ethylenically unsaturated monomer by means of any of the known methods.

The ethylenically unsaturated monomer is not particularly restricted but is preferred to be a monomer possessing an unsaturated double bond at the terminal thereof. As concrete examples of the monomer of this description, anionic monomers such as (meth)acrylic acid, 2-(meth) acryloyl ethane sulfonic acid, 2-(meth)acryloyl propane sulfonic acid, 2-(meth)acrylamide-2-methyl propane sulfonic acid, vinyl sulfonic acid, and styrene sulfonic acid and salts thereof; nonionic hydrophilic group-containing monomers such as (meth)acrylamide, N-substituted (meth)acrylamide, 2-hydroxyethyl (meth)acrylate, and 2-hydroxypropyl(meth)acrylate; and amino group-containing unsaturated monomers such as N,N-dimethylaminoethyl (meth)acrylate, N,N-diethylaminoethyl (meth)acrylate, N,N-diethylaminopropyl (meth)acrylate, and N,N-dimethylaminopropyl (meth)acrylamide and quaternized products thereof may be cited. These monomers may be used either singly or in the form of a mixture of two or more members. Among monomers enumerated above, (meth)acrylic acid, 2-(meth)acryloyl ethane sulfonic acid, 2-(meth)acrylamide-2-methylpropane sulfonic acid, and salts thereof, N,N-dimethylaminoethyl(meth)acrylate and quaternized N,N-dimethylaminoethyl (meth)acrylate, and (meth)acrylamide prove preferable and acrylic acid and/or a salt thereof prove particularly preferable.

When an acrylic acid salt is used as the monomer, the monovalent salt of acrylic acid selected from among alkali metal salts, ammonium salt, and amine salt of acrylic acid proves favorable from the viewpoint of the ability of the water absorbent resin to absorb water. More preferably, the alkali metal salt of acrylic acid and particularly preferably the acrylic acid salt selected from among sodium salt, lithium salt, and potassium salt prove favorable.

In the production of the water absorbent resin, other monomer components than the monomers enumerated above may be used in amount incapable of impairing the effect of this invention. As concrete examples of such other monomer components, hydrophobic monomers such as aromatic ethylenically unsaturated monomers having carbon numbers in the range of 8-30, aliphatic ethylenically unsaturated monomers having carbon numbers in the range of 2-20, alicyclic ethylenically unsaturated monomers having carbon numbers in the range of 5-15, and alkyl esters of (meth) acrylic acid containing alkyl groups having carbon numbers in the range of 4-50 may be cited. The proportion of such a hydrophobic monomer is generally in the range of 0-20 weight parts based on 100 weight parts of the ethylenically unsaturated monomer mentioned above. If the proportion of the hydrophobic monomer exceeds 20 weight parts, the overage will possibly result in degrading the water absorbing property of the produced water absorbent resin.

The water absorbent resin which is used in this invention is insolubilized by the formation of an internal crosslink. This internal crosslink may be the product obtained by the self-cross-linkage using no cross-linking agent. It may be formed by using an internal cross-linking agent possessing not less than two polymerizable unsaturated group and/or not less than two reactive functional groups in the molecular unit.

The internal cross-linking agent of this description does not need to be particularly restricted. As concrete examples of the inner cross-linking agent, N,N'-methylenebis(meth)acrylamide, N-methylol (meth)acrylamide, glycidyl (meth)acrylate, (poly)ethylene glycol di(meth)acrylate, (poly)propylene glycol di(meth)acrylate, glycerin tri(meth)acrylate, glycerin acrylate methacrylate, polyvalent metal salts of (meth) acrylic acid, trimethylol propane tri(meth)acrylate, triallyl amine, triallyl cyanurate, triallyl isocyanurate, triallyl phosphate, ethylene glycol diglycidyl ether, (poly)glycerol glycidyl ether, and polyethylene glycol diglycidyl ether may be cited. These internal crosslinking agents may be used in the form of a mixture of two or more members.

The amount of the internal cross-linking agent to be used is preferably in the range of 0.0001-1 mol %, more preferably in the range of 0.001-0.5 mol %, and still more preferably in the range of 0.005-0.2 mol %. If this amount falls short of 0.0001 mol %, the shortage will result in preventing the internal cross-linking agent from being introduced into the resin. Conversely, if the amount exceeds 1 mol %, the excess will possibly result in unduly heightening the gel strength of the water absorbent resin and lowering the absorption capacity. For the introduction of the cross-linked structure into the interior of the polymer by the use of the internal cross-linking agent, it suffices to add the internal cross-linking agent into the reaction system before, during, or after the polymerization of the monomer or after neutralization of the produced polymer.

For the purpose of producing the water absorbent resin, it suffices to polymerize the monomer components including the monomer mentioned above and the internal cross-linking agent in an aqueous solution thereof. The polymerization initiators which can be used in this case are water-soluble radical polymerization initiators including persulfates such as potassium persulfate, ammonium persulfate, and sodium persulfate; potassium peracetate, sodium peracetate, potassium percarbonate, sodium percarbonaate, and t-butyl hydroperoxide; hydrogen peroxide; azo compounds such as 2,2'-azobis (2-amidinopropane)-dihydrochloride and photopolymerization initiators including 2-hydroxy-2-methyl-1phenyl-propan-1-on, for example. The water-soluble radical polymerization initiators mentioned above may be combined with a reducing agent such as a sulfite, L-ascorbic acid, or a ferric salt so as to be used as redox type initiators.

The concentration of the monomer in the aqueous monomer solution mentioned above does not need to be particularly restricted but falls preferably in the range of 15-90 wt. % and more preferably in the range of 35-80 wt. %. If this concentration falls short of 15 wt. %, the shortage will be at a disadvantage in necessitating consumption of heat and time for drying because the resultant hydrogel has an unduly large water content.

The method to be adopted for the polymerization is not particularly restricted but may be selected from among the known methods such as solution polymerization, reversed-phase suspension polymerization, precipitation polymerization, and bulk polymerization. Among these methods, the aqueous solution polymerization which comprises dissolving a monomer in an aqueous solution and polymerizing it in the aqueous solution, and the reversed phase suspension polymerization prove particularly advantageous on account of the ease of control of a polymerization reaction and the performance of a produced water absorbent resin.

In initiating the aforementioned polymerization, the polymerization initiator mentioned above is used to effect this initiation. Besides the polymerization initiator mentioned above, such active energy rays as ultraviolet rays, electron radiation, and γ rays may be used either singly or in combination with a polymerization initiator. Though the temperature in initiating the polymerization depends on the kind of polymerization initiator to be used, it falls preferably in the range of 15-130° C. and more preferably in the range of 20-120° C. If the temperature in initiating the polymerization deviates from the range mentioned above, the deviation will be at a disadvantage in increasing the residual monomer in the produced water absorbent resin and suffering the self cross-linking reaction to proceed excessively and consequently degrading the water absorbing property of the water absorbent resin.

The term "reversed phase suspension polymerization" refers to a method of polymerization performed on an aqueous monomer solution suspended in a hydrophobic organic solvent. It is disclosed in U.S. Pat. Nos. 4,093,776, 4,367,323, 4,446,261, 4,683,274, and 5,244,735, for example. The term "aqueous solution polymerization" refers to a method for polymerizing an aqueous monomer solution without using a dispersing solvent. It is disclosed in U.S. Pat. Nos. 4,625,001, 4,873,299, 4,286,082, 4,973,632, 4,985,518, 5,124,416, 5,250,640, 5,264,495, 5,145,906, and 5,380,808 and European Patent Nos. 0811636, 0955086, and 0922717, for example. The monomers and the initiators which are cited by way of illustration in these methods of polymerization can be applied to this invention.

The aqueous solution polymerization can be implemented by polymerizing the product of partial neutralization of acrylic acid or polymerizing an acid group-containing monomer such as acrylic acid and thereafter neutralizing the resultant polymer with an alkali compound such as sodium hydroxide, ammonium hydroxide, sodium carbonate, or ammonium carbonate.

Incidentally, the neutralization ratio of the produced water absorbing resin containing an acid group (the mol % of the neutralized acid group in the whole acid group) is in the range of not less than 50 mol % and less than 95 mol %, preferably in the range of 53-85 mol %, still more preferably in the range of 55-75 mol %, and most preferably in the range of 60-65 mol %. If the aforementioned neutralization ratio falls short of 50 mol %, the shortage will possibly result in greatly lowering the water absorbency of the water absorbing resin. If it exceeds 95 mol %, the overage will possibly result in preventing the surface treatment from proceeding.

After the polymerization, generally the cross-linked polymer in the form of hydrogel ensues. While this invention allows this hydrogel-like cross-linked polymer in its unaltered form as the water absorbing resin, it prefers the polymer to be dried till the water content (%) (100−solid content (%)) which will be specifically described below.

The water absorbent resin which is used in this invention is preferably a powdery water absorbent resin which is obtained by polymerizing a monomer having acrylic acid (salt) particularly as its main component. The hydrogel-like cross-linked polymer which is obtained by polymerization is preferably dried and subsequently pulverized to a water absorbent resin. The drying may be effected by using a drier such as a hot air drier at a temperature in the range of 100-220° C. and more preferably in the range of 120-200° C.

For use in the pulverization, among shear primary crushers, impact shredders, and high speed rotary grinders included in the names of the powdering machines classified in Table 1.10 of Particle Technology Handbook (first edition, compiled by Particle Technology Association), the powdering machines which possess at least one of the powdering mechanisms such as cutting, shearing, striking, and rubbing can be adopted particularly favorably. Among the powdering machines which answer the foregoing description, the powdering machines which have cutting and shearing as main mechanisms can be used particularly advantageously. A roll mill (roll rotary type) powdering machine may be cited as a preferred example.

The water absorbing resin to be used in this invention is preferably in a powdered form. Preferably it is a powdered water absorbing resin which contains particles of diameters of not less than 150 μm and less than 850 μm (as defined by sieve classification) at a ratio in the range of 90 weight %-100 weight %, preferably in the range of 93 weight %-100 weight %, particularly preferably in the range of 95 weight %-100 weight %, still more preferably in the range of 98 weight %-100 weight %, and most preferably in the range of 99 weight %-100 weight %.

When the aforementioned powdered water absorbing resin happens to have particles of not less than 850 μm in diameter account for a large proportion of all the particles thereof and the water absorbing agent manufactured from this resin is used in a disposable diaper, the disposable diaper gives an unpleasant touch to the skin and has the possibility of rupturing the top sheet thereof and retarding the water absorption speed. When the particles of less than 150 μm in diameter account for a large proportion, the resin powder aggregates when it adds water, fails to undergo uniform irradiation with the active energy rays, and allows no enhancement of the water absorption capacity against pressure. When the resin is used in a disposable diaper, for example, it has the possibility of passing through the top sheet of the diaper.

Then, the weight average particle diameter (D50) of the water absorbing resin is preferably not less than 300 μm and less than 500 μm, more preferably in the range of 300-450 μm, and particularly preferably in the range of 300-400 μm. If the weight average particle diameter of the water absorbing resin exceeds 500 μm, the water absorbing agent manufactured from the resin, when used in a disposable diaper, for example, will give an unpleasant touch to the skin and will have the possibility of rupturing the top sheet of the diaper and retarding the water absorption speed. If this diameter falls short of 300 μm, the resin will possibly form aggregates when it adds with water, fail to undergo uniform irradiation with the ultraviolet rays, and allow no enhancement of the water absorbency against pressure.

The logarithmic standard deviation of particle size distribution ($\sigma\zeta$) of the water absorbing resin is preferably in the range of 0.20-0.45, more preferably in the range of 0.20-0.40, particularly desirably in the range of 0.20-0.35, and still more preferably in the range of 0.20-0.30. The logarithmic standard deviation of particle size distribution (σζ) means a magnitude which decreases in accordance as the particle size distribution decreases. For the water absorbing resin of this invention, what is important is that the particle size distribution is not simply narrow but is widened to a certain extent. If the logarithmic standard deviation of particle size distribution (σζ) of the aforementioned water absorbing resin exceeds 0.45, the overage will possibly result in preventing the water absorbency against pressure from being obtained as aimed at because of an unduly wide particle size distribution. If it falls short of 0.20, the shortage will possibly result in conspicuously lowering the productivity of the water absorbing resin.

Incidentally, the weight average particle diameter of the water absorbing resin (D50) and the logarithmic standard deviation of particle size distribution (σζ) of the water absorbing resin are the magnitudes which are determined by the method specified in the working example which will be cited herein below.

The water absorbing resin to be used in this invention has an eluted soluble content is preferably not less than 0.1 weight parts and less than 30 weight parts, more preferably in the range of 1-25 weight parts, still more preferably in the range of 3-20 weight parts, and most preferably in the range of 5-15 weight parts per 100 weight parts of the aforementioned water absorbing resin. If the eluted soluble content of the water absorbing resin falls short of 0.1 weight parts, the shortage will possibly result in necessitating a large amount of an inner cross-linking agent during the course of polymerization, heightening the cost, and further greatly lowering the water absorbency. Conversely, if the eluted soluble content of the water absorbing resin exceeds 30 weight parts, the overage will possibly result in inducing liquation of a soluble component during the addition of water or an aqueous solution, suffering the soluble component to function as a binder between the adjacent water absorbing resin particles, giving rise to lumps of powder, preventing the surface treatment from proceeding uniformly, and preventing the water absorbency against pressure from being sufficiently exalted.

The water absorbing resin to be used in this invention may be also obtained by preparing a water absorbing resin precursor having a neutralization ratio of low degree and then mixing the water absorbing resin precursor with a base. Heretofore, polyfunctional surface treating agents has been used for the surface treatment (surface cross-linking treatment). These polyfunctional surface treating agents possess the character of reacting with the carboxyl groups (—COOH) in the water absorbing resin but failing to react with the salt thereof (such as, for example, —COONa). Thus, by polymerizing an ethylenically unsaturated monomer mixture (the mixture of acrylic acid and sodium acrylate, for example) adjusted in advance so as to have the ratio of existence of —COOH/—COONa fall in a proper range thereby producing a water absorbing resin having —COOH and —COONa distributed uniformly therein, and using the produced water absorbing resin for the surface treatment with polyfunctional surface treating agents, it is made possible to obtain uniform cross-linkage. When the water absorbing resin obtained by polymerizing such an acid type ethylenically unsaturated monomer as acrylic acid as a main component and then neutralizing the resultant polymer with an alkali compound such as sodium hydroxide or sodium carbonate is surface cross-linked with polyfunctional surface treating agents, the cross-linkage is indeed at an advantage in yielding a small eluted soluble content of the water absorbing resin. Nevertheless, this cross-linkage inevitably suffers a decrease of the water absorption property because —COOH and —COONa are not uniformly distributed. Thus, it has not been commendable to subject the water absorbing resin obtained by the latter method to the conventional surface cross-linkage with the polyfunctional surface treating agents. According to the method of this invention, it is made possible to modify a water absorbing resin obtained by polymerizing a monomer/monomer mixture having as main component such an acid type ethylenically unsaturated monomer as acrylic acid thereby obtaining a water absorbing resin precursor having a low a neutralizing ratio and then neutralizing the water absorbing resin precursor with an alkali compound such as sodium hydroxide or sodium carbonate, similar to the water absorbing resin having —COOH and —COONa distributed uniformly thereon. The water absorbing agent which is obtained by this method can manifest excellent water absorption properties.

The term "water absorbing resin precursor of a neutralization ratio of low level" as used in this invention refers to a water absorbing resin precursor having a low neutralization ratio (the mol % of the neutralized acid group in all the acid groups). Specifically, it refers to the precursor having a neutralization ratio (the mol % of the neutralized acid group in all the acid groups) in the range of 0-50 mol % and preferably in the approximate range of 0-25 mol %. The water absorbing resin precursor of a neutralization point of such low level can be obtained by following the aforementioned method while using a monomer mixture including such an acid group-containing monomer as acrylic acid preferably in such a manner as to acquire the aforementioned neutralizing ratio. Thus, the detailed explanation of the precursor will be omitted here.

The water content of the water absorbing resin to be used for the method of producing a water absorbing agent according to this invention does not need to be particularly restricted so long as the water absorbing resin possesses fluidity. The water content of the water absorbing resin after being dried at 180° C. for three hours is in the range of 0-20 weight %, preferably in the range of 0-10 weight %, and more preferably in the range of 0-5 weight %. Incidentally, the water content of the water absorbing resin is the magnitude determined by the method specified in the working example which will be cited herein below.

Further, in the method of this invention, during the course of mixing of the water absorbing resin and water mentioned above, other additives may be additionally used with the object of imparting other functions to the water absorbing agent unless they exert such adverse effects as deterioration on the water absorbing resin obtained in consequence of the radiation of the ultraviolet rays. Anti-fungus agents, aromatic agents, deodorants, etc. may be cited as concrete examples of the additives mentioned above.

(b) Mixture of Water Absorbing Resin, Water, and Mixing Aid

In the method of this invention, the water-soluble radical polymerization initiator and the ethylenically unsaturated monomer are not added at the time of mixing the water absorbing resin, water, and the mixing aid. Therefore, the range of this invention dose not include the case of adding only the water-soluble radical polymerization initiator or adding only the ethylenically unsaturated monomer at the time of mixing the water absorbing resin, water.

As regards the mixing ratio of the aforementioned water absorbing resin and water, water is added in an amount preferably of not less than 1 weight part and less than 50 weight parts, more preferably in the range of 2-30 weight parts, still more preferably in the range of 3-15 weight parts, particularly preferably in the range of 4-13 weight parts, and most preferably in the range of 5-10 weight parts, based on 100 weight parts of the water absorbing resin. If the amount of water falls short of 1 weight part, the shortage will possibly result in preventing the radiation of the ultraviolet rays from inducing surface cross-linkage as expected. If it is not less than 50 weight parts, the overage will possibly result in greatly lowering the water absorbency against no pressure and against pressure of the produced water absorbing resin.

In this invention, the mixing aid is not particularly limited, so long as that it should be a water-soluble or water-dispersible compound except an ethylenically unsaturated monomer or a water-soluble radical polymerization initiator, and it can repress the agglomeration of the water absorbent resin with water and improve the mixing of the aqueous solution with the water absorbent resin. Since the addition of the mixing aid can repress the agglomeration of the water absorbent resin with water, and induce the uniform mixing of the aqueous solution with the water absorbent resin, the ultraviolet rays, when irradiated in the subsequent step, can be irradiated equally and evenly to the water absorbent resin and thus the uniform surface cross-linkage of the entire water absorbent resin can be attained. To be specific, a surfactant, a water-soluble polymer compound, a hydrophilic organic solvent, a water-soluble inorganic compound, an inorganic acid, an organic acid, and an organic salt are available. In this specification, the term "water-soluble compound" is referred to as a compound having solubility in 100 g of water at room temperature of not less than 1 g, preferably not less than 10 g.

When the mixing aid is used, the mode of using the mixing aid is not particularly restricted. Though the mixing aid may be used in the form of powder or as dissolved, dispersed, or suspended in a solution, it is preferably used in the form of an aqueous solution. Incidentally, the aqueous solution may incorporate other solvent than water within the range in which the solubility of the mixing aid is not impaired.

When the mixing aid is used, the sequence of addition of the mixing aid is not particularly restricted. Either of a method which consists in preparatorily adding the mixing aid and then adding the water absorbing resin and water thereto and mixing them altogether and a method which consists in simultaneously mixing the water absorbing resin, water, and the mixing aid may be adopted.

The aqueous solution containing the mixing aid has a surface tension preferably in the range of 40-75 dynes/cm, more preferably in the range of 45-70 dynes/cm, still more preferably in the range of 48-65 dynes/cm, and most preferably in the range of 50-60 dynes/cm. If the surface tension falls short of 40 dynes/cm, the shortage will possibly result in lowering the capillary capacity of the water absorbing resin during the course of absorbing water and, when the resin is used as in a disposable diaper, increasing the amount of the absorbed liquid suffered to flow back. If the surface tension exceeds 75 dynes/cm, the overage will possibly result in disrupting the uniformity of the mixture of the water absorbing resin and the aqueous solution and preventing the ultraviolet rays from being radiated uniformly. The surface tension of the aqueous solution containing the aforementioned mixing aid is the magnitude which is determined by the method specified in the working example cited herein below.

As the surfactant used as the mixing aid, at least one surfactant selected from the group consisting of nonionic surfactants and anionic surfactants having an HLB of not less than 7 can be used. As concrete examples of the surfactant, sorbitan fatty acid esters, polyoxyethylene sorbitan fatty acid esters, polyglycerin fatty acid esters, polyoxyethylene alkyl ethers, polyoxyethylene alkyl phenol ethers, polyoxyethylene acyl esters, sucrose fatty acid esters, higher alcohol sulfuric acid esters, alkyl naphthalene sulfonic acid salts, alkyl polyoxyethylene sulfate salts, and dialkyl sulfosuccinic acid salts may be cited. Among other surfactants enumerated above, polyoxyethylene alkyl ethers prove particularly advantageous. The molecular weight of the polyoxyethylene alkyl ether is preferably 200-100,000 and more preferably 500-10,000. If the molecular weight is unduly large, the overage will be at a disadvantage in lowering the solubility of the surfactant in water, allowing no addition of the amount to be added, increasing the viscosity of the solution, and impairing the mixing property of the surfactant with the water absorbing resin. Conversely, if the molecular weight is unduly small, the shortage will result in degrading the effect as a mixing aid.

As preferred examples of the water-soluble polymer compound, the macromolecule possesses solubility of not less than 1 wt. % in water at room temperature may be cited. For example, polyvinyl alcohol, polyethylene oxide, polyethylene glycol, polypropylene glycol, polyacryl amide, polyacrylic acid, sodium polyacrylate, polyethylene imine, methyl cellulose, carboxymethyl cellulose, hydroxy-ethyl cellulose, hydroxypropyl cellulose, dextrin, sodium alginate, and starch may be cited. Among other compounds enumerated above, polyethylene glycol proves particularly advantageous. The molecular weight of the compound is preferably 200-100,000 and more preferably 500-10,000, similarly to the polyoxyethylene alkyl ether.

As concrete examples of the hydrophilic organic solvent, alcohols such as methyl alcohol, ethyl alcohol, propyl alcohol, isopropyl alcohol, butyl alcohol, isobutyl alcohol, and t-butyl alcohol; ketones such as methylethyl ketone; ethers such as dioxane, alkoxy (poly)ethylene glycol, and tetrahydrofuran; amides such as g-caprolactam and N,N-dimethyl formamide; sulfoxides such as dimethyl sulfoxide; and polyhydric alcohols such as ethylene glycol, diethylene glycol, propylene glycol, triethylene glycol, tetraethylene glycol, 1,3-propane diol, dipropylene glycol, 2,2,4-trimethyl-1,3-pentadiol, glycerin, 2-butene-1,4-diol, 1,3-butane diol, 1,4-butane diol, 1,5-pentane diol, 1,6-hexane diol, 1,4-cyclohexane dimethanol, 1,2-cyclo-hexenol, trimethylol propane, diethanol amine, triethanol amine, polyoxypropylene, pentaerythritol, and sorbitol may be cited. These solvents may be used either singly or in the form of a mixture of two or more members.

As preferred examples of the water-soluble inorganic compound, the inorganic compound possesses solubility of not less than 5 wt. % in water may be cited. For example, water-soluble metal salts which are salts of metals having valences of at least one may be cited. As more specific examples of the water-soluble metal salt, alkali metal salts such as sodium chloride, sodium hydrogen sulfate, and sodium sulfate, ammonium salts such as ammonium chloride, ammonium hydrogen sulfate, and ammonium sulfate, alkali metal hydroxides such as sodium hydroxide and potassium hydroxide, polyvalent metal salts such as aluminum chloride, aluminum polychloride, aluminum sulfate, potassium alum, calcium chloride, calcium sulfate, calcium carbonate, magnesium chloride, magnesium sulfate, magnesium carbonate, zirconium sulfate, zirconium nitrate, zirconium acetate, zirconium carbonate, zirconium ammonium acetate, zirconium ammonium carbonate, zirconium oxychloride, zirconium chloride, titanium chloride, and titanium sulfate, and irreducible alkali metal salt pH buffer agents such as hydrogen carbonates, dihydrogen phosphates, and hydrogen phosphates may be cited.

As concrete examples of inorganic acids salts, the salts of the inorganic acid selected from the group consisting of hydrochloride acid, sulfuric acid, phosphoric acid, carbonic acid, and boric acid may be cited such as alkali metal salts and alkaline earth metal salts may be cited typically. Then, as concrete examples of organic acids salts, the salts of the organic acids selected from the group consisting of acetic acid, propionic acid, lactic acid, citric acid, succinic acid, malic acid, and tartaric acid may be cited such as alkali metal salts and alkaline earth metal salts may be cited typically.

Among other compounds enumerated above, polyoxyethylene alkyl ethers, polyethylene glycol, and water-soluble metal salts are advantageously usable as a mixing aid.

When such a macromolecular mixing aid as a polyoxyethylene alkyl ether or polyethylene glycol is used, the number average molecular weight (Mn) of this mixing aid is preferably 100-500000, more preferably 200-100000, still more preferably 500-10000, and particularly preferably 1000-5000. If the number average molecular weight mentioned above falls short of 100, the shortage will possibly result in impairing the mixability of the water absorbing resin and water, inducing formation of lumps of powder, preventing the surface cross-linkage from proceeding uniformly, and inhibiting the acquisition of a sufficient water absorbency against pressure. If it exceeds 500000, the overage will possibly result in lowering the solubility of the mixing aid in water and compelling the production in an actual device to incur troubles.

These mixing auxiliaries may be used either singly or in the form of a mixture of two or more members. Then, the amount of the mixing aid to be added is not particularly limited but is only required to repress the aggregation of the water absorbing resin with water, and improves the mixability of water and the water absorbing resin. Specifically, this amount is preferably not less than 0.01 weight part and less than 50 weight parts, more preferably in the range of 0.03-20 weight parts, particularly preferably in the range of 0.05-10 weight parts, still more preferably in the range of 0.1-5 weight parts, and most preferably in the range of 0.3-1 weight parts per 100 weight parts of the water absorbing resin. Otherwise, in this invention, the mixing aid may be used preferably in the range of 0-40 weight %, more preferably in the range of 0.01-30 weight %, and still more preferably in the range of 0.1-10 weight %, based on the total amount of the aqueous solution.

Incidentally, as means to mix the water absorbing resin, water or an aqueous solution, and the mixing aid, a method which consists in effecting the mixture by the use of an ordinary mixing device such as, for example, V-shaped mixer, a ribbon type mixer, a screw type mixer, a rotary disc type mixer, an air current type mixer, a batch type kneader, a continuous kneader, a paddle type mixer, or a spade type mixer may be cited.

(c) Keeping the Mixture in a Flowed State

The method of this invention consists in mixing the water absorbing resin, water and the mixing aid as described above and irradiating the resultant mixture with ultraviolet rays while keeping the mixture in a moving stream. By so doing, it is made possible to perform the surface treatment uniformly and conspicuously exalting the water absorbency against pressure without decreasing the water absorbency against no pressure. In the meantime, the ultraviolet rays used in this process preferably have a wavelength of exceeding 200 nm and not more than 400 nm.

For the purpose of fluidizing the mixture during the irradiation of the mixture with the ultraviolet rays, a method which consists in blowing a gas such as air, oxygen, or nitrogen into the mixture and a method which consists in fluidizing the aforementioned mixture are available besides a method which consists in stirring the mixture.

When the mixture containing the water absorbing resin and water is fluidized by the motion of stirring, the stirring speed is preferably 300-1000 rpm, more preferably 400-750 rpm, and still more preferably 450-550 rpm. If the stirring speed falls short of 300 rpm, the shortage will possibly result in preventing the ultraviolet rays from being uniformly radiated. If it exceeds 1000 rpm, the overage will possibly result in exposing the mixture to mechanical damage and increasing the content of fine particles in the water absorbing agent after the irradiation with the ultraviolet rays.

The fluidization of the mixture of the water absorbing resin and water or an aqueous solution and the mixing aid may be implemented by using the heretofore known device. As concrete examples of the known device, a shaking type mixer, a shaking feeder, a ribbon type mixer, a conical ribbon type mixer, a screw type mixing and extruding device, an air current type mixer, a batch type kneader, a continuous type kneader, a paddle type mixer, a high speed fluid type mixer, and a free ascent flow type mixer may be cited.

(d) Radiation of the Ultraviolet Rays (preferably having a wavelength of exceeding 200 nm and not More than 400 nm)

As a method for modifying the surface of a water absorbent resin (particles), the formation of a surface crosslinkage attained by using a surface crosslinking agent and promoting the relevant reaction by application of heat has been known to the public. For the sake of surface cross-linking the water absorbing resin as described above, such compounds as a polyhidric alcohol, a polyvalent glycidyl ether, a haloepoxy compound, or a polyvalent aldehyde which possesses a plurality of functional groups in the molecular unit thereof is used. Generally, when the polymerizing monomer component are heated to 100-300° C., these functional groups react with the carboxyl groups existing in the surface of the water absorbing resin and consequently induce formation of a cross-linked structure in the surface of the water absorbing resin.

Also, a method for modifying the surface of a water absorbent resin (particles) by adding a treatment liquid containing the radical polymerization compound to the water absorbing resin and irradiating the resultant mixture with active energy rays has been reported.

This invention, however, is characterized by being capable of forming a cross-linked structure in the surface of a water absorbing resin by irradiating a mixture of the water absorbing resin, water and the mixing aid with an active energy rays even in the absence of such a surfactant and a polymerizing monomer as mentioned above. Also by this characteristic property, it is made possible to exalt the water absorbency of the modified water absorbing agent against pressure (AAP) without lowering the water absorbency thereof against no pressure (CRC).

As the active energy rays to be used in this invention, there is no limit, but the ultraviolet rays preferably have a wavelength of exceeding 200 nm and not more than 400 nm. The ultraviolet rays having a wavelength of exceeding 200 nm and not more than 350 nm are more preferably used, and the ultraviolet rays having a wavelength of exceeding 200 nm and not more than 300 nm are still more preferably used. If the active energy rays having a wavelength exceeding 400 nm are radiated, the radiation will be deficient in energy and will possibly result in prevent the cross-linkage of the water absorbing resin from proceeding. If the active energy rays having a wavelength of not more than 200 nm are radiated, the radiation will be at a disadvantage in simultaneously inducing cross-linkage and severance and possibly deteriorating the water absorbing resin.

As regards the conditions of the radiation, the intensity of radiation is in the range of 3-100 mW/cm$^2$ and the dosage of radiation is in the range of 100-10000 mJ/cm$^2$ when the ultraviolet rays are used. As concrete examples of the device for radiating the ultraviolet rays, a high-pressure mercury lamp, a reduced-pressure mercury lamp, a metal halide lamp, and a halogen lamp may be cited. So long as the ultraviolet rays having a wavelength of preferably exceeding 200 nm and not more than 400 nm, more preferably exceeding 200 nm and not more than 350 nm, and still more preferably exceeding 200 nm and not more than 300 nm is radiated, it may contain other radiant rays and wavelength. The method for effecting this radiation is not particularly restricted. Incidentally, when the electron radiation is used, preferably the accelerating voltage is 50-800 kV and the absorbed dose rage is 0.1-100 Mrad.

Generally, the time for radiating the ultraviolet rays is preferably not less than 0.1 minute and less than 60 minutes, more preferably not less than 1 minute and less than 30 minutes, still more preferably not less than 2 minutes and less than 20 minutes, and particularly preferably not less than 3 minutes and less than 15 minutes. For the fixed cross-link density, the time for the surface cross-linking treatment may be curtailed as when it exceeds 60 minutes in the case of using the conventional surface cross-linking agent If the time of radiation falls short of 0.1 minute, the shortage will possibly result in preventing the surface treatment of the water absorbing resin from being sufficiently carried out. If it exceeds 60 minutes, the overage will possibly result in suffering the water absorbing resin to be degraded by the active energy rays.

The distance from the ultraviolet rays radiating lamp to the mixture containing the water absorbing resin, water, and the mixing aid is preferably 2-30 cm, more preferably 5-15 cm, and particularly preferably 8-15 cm. If this distance falls short of 2 cm, the shortage will possibly result in suffering the mixture of the water absorbing rein and water or an aqueous solution to adhere to the lamp. If the distance exceeds 30 cm, the overage will possibly result in bringing no sufficient effect in enhancing the intensity of the ultraviolet rays.

The surface treatment effected by the radiation of the ultraviolet rays does not require any warming. It is, however, commendable to radiate the ultraviolet rays in a warming environment because the warmth brings the effect of rendering difficult the formation of an aggregation during the mixture of the water absorbing resin and water or an aqueous solution. The warming temperature is only required to elevate the temperature of the water absorbing resin preferably to less than 150° C., more preferably to less than 120° C., still more preferably to room temperature -100° C., and particularly preferably to a temperature in the range of 50-100° C. Thus, the treating temperature can be set at a level lower than the conventional surface treating temperature.

In the method for producing of the present invention, the radiation of the ultraviolet rays does not require an inert environment.

(e) Other Treatments

After the irradiation of the active energy rays, the water absorbent resin may be optionally subjected to a heat treatment at a temperature in the range of 50-250° C. as for the purpose of drying.

After the radiation of the ultraviolet rays, the water absorbing resin may be made to form a surface cross-link by using any of the heretofore universally known surface cross-linking agents such as polyhydric alcohols, polyvalent epoxy compounds, and alkylene carbonates.

The method for producing the water absorbing agent according to this invention allows addition of a liquid passage enhancing agent to the water absorbing resin before, after, or during the radiation of the active energy rays. As concrete examples of the liquid passage enhancing agents, mineral products such as talc, kaolin, fuller's earth, bentonite, activated clay, barite, natural asphaltum, strontium ore, ilmenite, and pearlite; aluminum compounds such as aluminum sulfate 14-18 hydrates (or anhydrides), potassium aluminum sulfate dodecahydrate, sodium aluminum sulfate dodecahydrate, aluminum chloride, aluminum polychloride, and aluminum oxide and aqueous solutions thereof; other polyvalent metal salts; hydrophilic amorphous silicas (examples, dry process: product of Tokuyama K.K. sold under the trademark designation of "Reolosil QS-20", precipitation process: products of Degussa Corp. sold under the trademark designations of "Sipernat 22S" and "Sipernat 2200"); and oxide complexes such as silicon oxide aluminum oxide magnesium oxide complex (example, product of Engelhard Corp sold under the trademark designation of "Attagel #50"), silicon oxide aluminum oxide complex, and silicon oxide magnesium oxide complex may be cited. These liquid passage enhancing agents are mixed preferably in an amount of 0-20 weight parts, more preferably in an amount of 0.01-10 weight parts, and particularly preferably in an amount of 0.1-5 weight parts with 100 weight parts of the modified water absorbing resin. The liquid passage enhancing agent soluble in water is added in the form of an aqueous solution and not soluble in water is added in the form of powder or slurry. Other additives such as anti-fungus agent, deodorant, and chelating agent may be properly incorporated within the range mentioned above.

(f) Water Absorbing Agent

The term "water absorbing agent" as used in this invention refers to a water absorbing agent which is possessed of a modified surface (surface treatment).

When the method for producing a water absorbing agent according to this invention is executed, the produced water absorbing agent is enabled to acquire an exalted absorbency against pressure without decreasing the absorbency against no pressure. It has been heretofore known that the formation of a surface cross-link results in greatly lowering the absorbency of physiological saline against no pressure and nevertheless exalting the capacity for retaining the absorbed liquid even in a state of applying pressure, namely the absorbency against pressure. According to the method of this invention, the absorbency of the water absorbing resin against pressure of 2.07 kPa is increased by not less than 1 g/g even without using a water-soluble radical polymerization initiator and an ethylenically unsaturated monomer. This fact is thought to indicate that the method of this invention has introduced a surface cross-link to the surface of the water absorbing resin. In the solid state physical properties acquired after the modification, the absorbency under pressure is preferably not less than 3 g/g, more preferably not less than 5 g/g, still more preferably not less than 7 g/g, and particularly preferably not less than 10 g/g. Incidentally, the absorption capacity of the water absorbing resin against pressure of 2.07 kPa is the magnitude determined by the method specified in the working example cited herein below.

The water absorbing agent of this invention has an absorbency against pressure of 2.07 kPa of preferably not less than 15 g/g and less than 50 g/g, more preferably 18-40 g/g, still more preferably 20-35 g/g, and most preferably 25-30 g/g. If the absorbency against pressure mentioned above falls short of 15 g/g, the shortage will possibly result in suffering the water absorbing agent to assume an unduly small absorbency against pressure and, when the agent is used as in a disposable diaper, inducing leakage of urine. If it exceeds 50 g/g, the overage will possibly result in increasing the soluble component and inducing gel blocking.

Then, the absorbency against no pressure (CRC) is preferably not less than 8 g/g, more preferably not less than 15 g/g, still more preferably not less than 20 g/g, and particularly preferably not less than 25 g/g. Though the upper limit of this absorbency is not particularly restricted, it is preferably not more than 50 g/g, more preferably not more than 40 g/g, and still more preferably not more than 35 g/g. If the absorbency against no pressure (CRC) falls short of 8 g/g, the water absorbing agent has an unduly small amount of absorption and does not suit application to such sanitary materials as disposable diapers. If the absorbency against no pressure (CRC) exceeds 50 g/g, the overage will possibly result in weakening the gel strength and preventing the produced water absorbing agent from excelling in the absorbency against pressure.

Further, the water absorbing agent which is obtained according to this invention is characterized by having an extremely small residual monomer content. Since the water absorbing resin is used in such sanitary materials as disposable diapers, the smaller the residual monomer content is, the better the end use proves from the viewpoint of odor and safety. Ordinarily, the residual monomer content in the water absorbing resin is 200-500 ppm. The residual monomer content of the surface-treated water absorbing resin obtained by this invention is not more than 200 ppm (the lower limit is 0 ppm) in most cases. The residual monomer content of the modified water absorbing resin is preferably not more than 200 ppm, more preferably not more than 150 ppm, and still more preferably not more than 100 ppm.

Further, the water absorbing agent which is obtained by this invention has a small solid content as compared with the water absorbing agent obtained by the conventional method of modification which resides in adding the water absorbing resin and surface cross-linking agents added and heating them at an elevated temperature. This is because the method of production according to this invention requires no elevated temperature for the reaction and, therefore, allows the water contained in the aqueous solution added to the water absorbing resin to remain substantially intact even after the reaction. When the water content in the water absorbing agent is large, this large water content brings such effects as enabling the amount of fine particulates having such a particle diameter of not more than 150 µm as is unfavorable for health to be decreased by agglomeration, preventing generation of static electricity on the surface of particulates which constitutes the cause for blocking during the pneumatic transportation, and allaying the degradation of physical properties in consequence of the physical damage inflicted during the pneumatic transportation. The solid content of the water absorbing agent is preferably not more than 95%, more preferably not more than 93%, still more preferably not more than 90%, and particularly preferably not more than 85%. Though the lower limit of the solid content is not particularly restricted, the solid content falling below 70% possibly proves unfavorable, depending on the kind of use because the absorbency of the water absorbing agent per unit weight is unduly lowered.

The form of the surface-treated water absorbing agent which is obtained by this invention can be properly adjusted by the conditions of treatment such as the form of the water absorbent resin before the treatment and the agglomeration and molding of the treated water absorbent resin after the treatment. Generally, however, the modified water absorbent resin has a powdery form. This powder has a weight average particle diameter (specified by classification with sieves) which falls in the range of 10-1,000 µm and preferably in the range of 200-600 µm. In this powder, the content of particles having diameters of 150-850 µm falls preferably in the range of 90-100% by weight and more preferably in the range of 95-100% by weight based on the weight of the water absorbent resin.

The method for production according to this invention has an effect of causing the fine particles generated during the production of the water absorbing resin to be agglomerated during the course of surface cross-linking the water absorbing resin. Thus, even when the water absorbing resin yet to be modified happens to contain fine particles, the method for producing the water absorbing agent according to this invention enables the contained fine particles to be agglomerated and consequently results in decreasing the amount of fine particles contained in the produced surface-treated water absorbing agent. The particle-size distribution of the produced water absorbing agent is shifted toward the high particle size side as compared with that of the water absorbing agent yet to be modified. The ratio of this shifting, however, is varied by the amount of water to be mixed with the water absorbing resin, the condition of radiation of the ultraviolet rays, and the mode of fluidizing the mixture during the course of the radiation.

The water absorbing agent to be obtained by the method of this invention has formed over the whole surface of the water absorbing resin a uniform surface cross-link with a high cross-link density and is enabled to acquire characteristic properties expected of a water absorbing resin such as, for example, absorbency, absorption speed, gel strength, and suction force, at unusually high levels.

When this invention is executed in the presence of an ethylenically unsaturated monomer, the execution does not conform to the object of this invention because the absorption capacity against no pressure is decreased.

The water-soluble radical polymerization initiator is supposed to be dissolved in a ratio of not less than 10 weight % in water (25° C.). As concrete examples of this polymerization initiator, persulfates such as ammonium persulfate, sodium persulfate, and potassium persulfate; hydrogen peroxide; and water-soluble azo compounds such as 2,2'-azobis-2-amidinopropane dihydro-chloride and 2-2'-azobis[2-2(-imidazolin-2-yl)propane] dihydrochloride may be cited.

In accordance with this invention, the surface treatment of the water absorbent resin is effected fully satisfactorily even at a reaction temperature in the neighborhood of room temperature and the surface-treated water absorbent agent consequently obtained is enabled to manifest at extremely high levels such characteristic properties as absorption capacity, absorption speed, gel strength, and suction force which the water absorbent resin is expected to possess. The water absorbent resin which is obtained by this invention, therefore, is, optimally usable for sanitary cotton, disposable diapers, and other sanitary materials for absorbing body fluid and for agricultural activities.

EXAMPLES

Now, this invention will be explained more specifically below with reference to working examples and comparative examples. This invention is not limited to these working examples. Incidentally, the varying properties of water absorbing resins described therein were determined by the following methods. All the operations described therein were carried out under the conditions of room temperature (20-25° C.) and humidity 50 RH % unless special conditions were mentioned.

(1) Centrifuge Retention Capacity (Abbreviated as CRC)

The centrifuge retention capacity (CRC) indicates the absorbency exhibited by a given sample after 30 minutes' standing against no pressure in an aqueous 0.90 weight % saline solution. A pouch (85 mm×60 mm) made of non-woven fabric (made by Nangoku Pulp Kogyo K.K. and sold under the trademark designation of "Heatlon Paper, Type GSP-22") was packed uniformly with 0.200 g of a given water absorbing resin or water absorbent agent, heat sealed, and immersed in a large excess (generally about 500 ml) of an aqueous 0.90 weight % sodium chloride solution at room temperature. The pouch was pulled up from the solution after 30 minutes of standing therein and drained for three minutes with the centrifugal force (250 G) described in edana ABSORBENCY 11 441.1-99 by using a centrifugal separator (made by Kokusansha K.K. and sold under the product code of "Type H-122"). Then, the drained pouch was weighed to find the weight W1 (g) thereof. The same procedure was repeated without using a water absorbing resin and the drained pouch was weighed to find the weight W0 (g). Then, the centrifuge retention capacity (CRC) (g/g) was calculated in accordance with the following formula using the found values of W1 and W0.

Centrifuge retention capacity (CRC) (g/g)=($W1$ (g)−$W0$ (g))/(weight (g) of water absorbing resin or water absorbing agent)−1

(2) Absorbency Against Pressure 0.3 psi (Abbreviated as "AAP 0.3")

The absorbency against pressure 0.3 psi (AAP 0.3) indicates the absorbency indicated by a given sample after 60 minutes' standing under pressure of 2.07 kPa (0.3 psi) in an aqueous 0.90 weight % saline solution.

Figure 1:
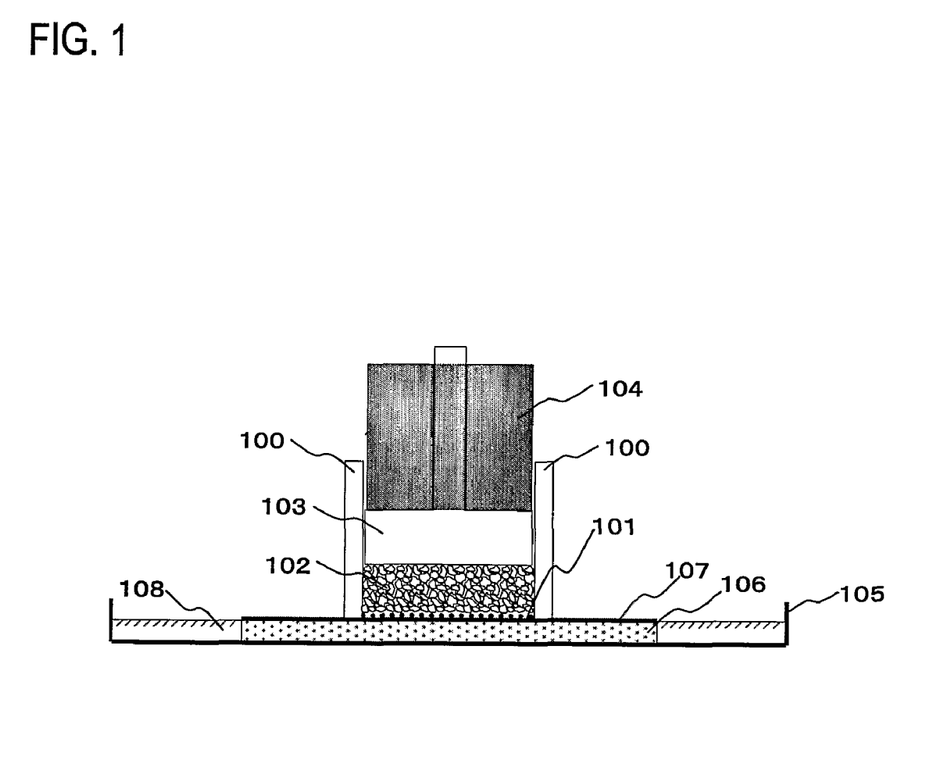
FIG. 1 is a schematic diagram of a device used for determining the absorbency 0.3 psi against pressure.

In an apparatus illustrated in FIG. 1, a 400-mesh metal gauze 101 (aperture 38 μm) made of stainless steel was fused to the bottom of a plastic supporting cylinder 100 having an inside diameter of 60 mm. On the metal gauze, 0.900 g of a given water absorbing resin or water absorbing agent was uniformly scattered under the conditions of room temperature (20-25° C.) and humidity 50 RH % and a piston 103 and a load 104 adjusted so as to exert a load of 2.07 kPa (0.3 psi) on the scattered sample, given an outside diameter slightly smaller than 60 mm and prevented from producing an interspace between themselves and the supporting cylinder, and enabled to produce an uninterrupted vertical motion were mounted on the scattered sample sequentially in the order mentioned. The whole of the apparatus was weighed to find the weight W2 (g) thereof.

Inside a petri dish 105 having a diameter of 150 mm, a glass filter 106 having a diameter of 90 mm (made by Sogo Rikagaku Glass Seisakusho K.K., having a pore diameter of 100-120 μm) was placed and an aqueous 0.90 weight % saline solution 108 (20-25° C.) was added till the same level as the upper surface. On the soaked glass filter in the petri dish, one filter paper 107 having a diameter of 90 mm (made by ADVANTEC Toyo K.K. and sold under the product name "JIS P 3801, No. 2," and having a thickness of 0.26 mm and a retention particle diameter of 5 μm) was placed so as to have the surface completely wetted, with the excess liquid removed therefrom.

The whole apparatus mentioned above was placed on the aforementioned filter paper and the water absorbing resin or the water absorbing agent was left absorbing the liquid under the load. After the lapse of one hour thence, the whole apparatus was lifted and weighed to find the weight W3 (g) thereof. The absorbency against pressure 0.3 psi (AAP 0.3) (g/g) was calculated in accordance with the following formula, using the found weights W2 and W3.

Absorbency against pressure 0.3 psi (AAP 0.3)=($W3$ (g)−$W2$ (g))/(Weight of water absorbing resin or water absorbing agent (0.900 g))

(3) Weight Average Particle Diameter (D50) and Logarithmic Standard Deviation of Particle Diameter Distribution (σζ)

A given water absorbing resin was classified with JIS standard sieves (JIS Z 8801-1 (2550)) measuring 850 μm, 710 μm, 600 μm, 500 μm, 425 μm, 300 μm, 212 μm, 150 μm, 106 μm, and 45 μm in aperture and the residual percentages R consequently found were plotted on a logarithmic probability paper. The particle diameter corresponding to R=50 weight % was read out as the weight average particle diameter (D50). Let X1 stand for the particle diameter for R=84.1% and X2 the particle diameter for R=15.9% respectively, and the logarithmic standard deviation (σζ) will be expressed by the following formula. The magnitude (σζ) signifies that the particle size distribution narrows in accordance as this magnitude decreases.

$\sigma\zeta = 0.5 \times \ln(X2/X1)$

The classification adopted in determining the logarithmic standard deviation (σζ) in the particle size distribution was effected by charging the JIS standard sieves (the Iida Testing Sieves: diameter 8 cm) measuring 850 μm, 710 μm, 600 μm, 500 μm, 425 μm, 300 μm, 212 μm, 150 μm, 106 μm, and 45 μm in aperture with 10.0 g of a given water absorbing resin under the conditions of room temperature (20-25° C.) and humidity 50 RH % and shaking the sieves with a shaking classifier (Iida Sieve Shaker, Type ES-65, Ser No. 0501).

(4) Eluted Soluble Content

In a plastic container having an inner volume of 250 ml and furnished with a lid, 184.3 g of an aqueous 0.9 weight % saline solution was placed, 1.00 g of a given water absorbing resin or water absorbing agent was added to the aqueous solution, and they were stirred by rotating a stirrer so as to extract an eluted soluble component from the resin for 16 hours. The extracted liquid was filtered with one filter paper (made by ADVANTEC Toyo K.K. and sold under the product name "JIS P 3801, No. 2," and having a thickness of 0.26 mm and a retention particle diameter of 5 μm). The portion 50.0 g of the resultant filtrate was taken as a test solution.

First, 50.0 g of an aqueous 0.9 weight % saline solution alone was titrated first with an aqueous 0.1N NaOH solution till pH 10 and then with an aqueous 0.1N HCl solution till pH 2.7 to obtain titers ([bNaOH] ml and [bHCl] ml).

By performing the same titrating operation on the test solution, the titers ([NaOH] ml and [HCl] ml) were obtained.

In the case of a water absorbing resin formed of known amounts of acrylic acid and a sodium salt thereof, for example, the eluted soluble content of the water absorbing resin was calculated in accordance with the following formula, based on the average molecular weight of the monomer and the titers found by the aforementioned operation. When the amounts mentioned above were unknown, the average molecular weight of the monomer was calculated by using the neutralization ratio determined by titration.

Eluted soluble content (weight %)=0.1×(average molecular weight of monomer)×184.3×100×([HCl]−[bHCl])/1000/1.0/50.0

Neutralization ratio (mol %)=(1−([NaOH]−[bNaOH])/([HCl]−[bHCl]))×100

(5) Water Content

In an aluminum cup measuring 4 cm in diameter of bottom surface and 2 cm in height, 1.00 g of a given water absorbing resin was uniformly scattered on the bottom surface of the aluminum cup. The aluminum cup containing the absorbing agent was weighed to find the weight W4 (g). It was left standing in a hot air drier adjusted at 180° C. for 3 hours. The agent-containing aluminum cup was weighed to find the weight W5 (g) immediately after it was taken out of the hot air drier (within less than 1 minute). The water content (weight %) was calculated in accordance with the following formula using these weights W4 and W5.

Water content (weight %)={W4 (g)−W5 (g))/(weight (g) of water absorbing resin)×100

(6) Surface Tension of Mixing Aid Solution

In a thoroughly washed 100 mL beaker, 40 mL of purified water of 20° C. was placed and the purified water was tested for surface tension by the use of a surface tension meter (made by Kruss Corp and sold under the trademark designation of "Kll Automatic Surface Tension Meter"). In this determination, the magnitude of surface tension must be in the range of 72-74 dynes/cm. Then, the mixing aid solution adjusted to 20° C. was tested for surface tension by following the same procedure. Incidentally, this invention adopted the plate method using a platinum plate, which was thoroughly cleaned with water prior to each determination and thermally cleaned with a burner prior to use.

Referential Example 1

In a reaction vessel formed by attaching a stopper to a jacketed stainless steel twin arm type kneader furnished with two sigma type vanes and having an inner volume of 10 liters, 8.55 g of polyethylene glycol diacrylate was dissolved in 5446 g of an aqueous sodium acrylate solution having the monomer concentration of 39 weight % and the neutralization ratio of 60 mol % to prepare a reaction solution. Then, this reaction solution was deaerated in an atmosphere of nitrogen gas for 30 minutes. When 20.1 g of an aqueous 10 weight % sodium persulfate solution and 25.2 g of an aqueous 0.1 weight % L-ascorbic acid solution were subsequently added as kept stirred to the reaction solution, polymerization was initiated within about one minute of adding the aqueous solutions. Then, the polymerization was carried out at 20-95° C. while the formed gel was continuously pulverized. After the elapse of 30 minutes subsequent to the start of polymerization, a hydrogel-like cross-linked polymer was taken out. The produced hydrogel-like cross-linked polymer was in a form finely divided into particulates not more than about 5 mm in diameter. This finely divided hydrogel-like cross-linked polymer was spread on a 50-mesh metal gauze (aperture 300 μm) and dried with hot air at 175° C. for 50 minutes. Thus, a water absorbing resin (A) formed of indeterminately shaped, easily pulverizable aggregates of a particulate or powdery dry product was obtained.

The water absorbing resin (A) was pulverized with a roll mill and further classified with a JIS standard sieve having an aperture of 710 μm. Then, the particles which had passed the apertures of 710 μm in the foregoing operation were classified with a JIS standard sieve having an aperture of 150 μm to remove the water absorbing resin particles which had passed the JIS standard sieve of an aperture of 150 μm. Thus, a water absorbing resin (A1) was obtained. The water absorbing resin (A1) was rated to determine various properties. As a result of the rating, physical properties shown in Table 1 and the various particle size distributions shown in Table 2 were obtained.

Referential Example 2

In a reaction vessel formed by attaching a stopper to a jacketed stainless steel twin arm type kneader furnished with two sigma type vanes and having an inner volume of 10 liters, 7.95 g of polyethylene glycol diacrylate was dissolved in 5438 g of an aqueous sodium acrylate solution having the monomer concentration of 39 weight % and the neutralization ratio of 70 mol % to prepare a reaction solution. Then, this reaction solution was deaerated in an atmosphere of nitrogen gas for 30 minutes. When 29.43 g of an aqueous 10 weight % sodium persulfate solution and 24.53 g of an aqueous 0.1 weight % L-ascorbic acid solution were subsequently added as kept stirred to the reaction solution, polymerization was initiated within about one minute of adding the aqueous solutions. Then, the polymerization was carried out at 20-95° C. while the formed gel was continuously pulverized. After the elapse of 30 minutes subsequent to the start of polymerization, a hydrogel-like cross-linked polymer was taken out. The produced hydrogel-like cross-linked polymer was in a form finely divided into particulates not more than about 5 mm in diameter. This finely divided hydrogel-like cross-linked polymer was spread on a 50-mesh metal gauze (aperture 300 μm) and dried with hot air at 175° C. for 50 minutes. Thus, a water absorbing resin (B) formed of indeterminately shaped, easily pulverizable aggregates of a particulate or powdery dry product was obtained.

The water absorbing resin (B) was pulverized with a roll mill and further classified with a JIS standard sieve having an aperture of 710 μm. Then, the particles which had passed the apertures of 710 μm in the foregoing operation were classified with a JIS standard sieve having an aperture of 150 μm to remove the water absorbing resin particles which had passed the JIS standard sieve of an aperture of 150 μm. Thus, a water absorbing resin (B1) was obtained. The water absorbing resin (B1) was rated to determine various properties. As a result of the rating, physical properties shown in Table 1 and the various particle size distributions shown in Table 2 were obtained.

Referential Example 3

In a reaction vessel formed by attaching a stopper to a jacketed stainless steel twin arm type kneader furnished with two sigma type vanes and having an inner volume of 10 liters, 9.39 g of polyethylene glycol diacrylate was dissolved in 5447 g of an aqueous sodium acrylate solution having the monomer concentration of 39 weight % and the neutralization ratio of 80 mol %. to prepare a reaction solution. Then, this reaction solution was deaerated in an atmosphere of nitrogen gas for 30 minutes. When 19.1 g of an aqueous 10 weight % sodium persulfate solution and 23.9 g of an aqueous 0.1 weight % L-ascorbic acid solution were subsequently added as kept stirred to the reaction solution, polymerization was initiated within about one minute of adding the aqueous solutions. Then, the polymerization was carried out at 20-95° C. while the formed gel was continuously pulverized. After the elapse of 30 minutes subsequent to the start of polymerization, a hydrogel-like cross-linked polymer was taken out. The produced hydrogel-like cross-linked polymer was in a form finely divided into particulates not more than about 5 mm in diameter. This finely divided hydrogel-like cross-linked polymer was spread on a 50-mesh metal gauze (aperture 300 μm) and dried with hot air at 175° C. for 50 minutes. Thus, a water absorbing resin (C) formed of indeterminately shaped, easily pulverizable aggregates of a particulate or powdery dry product was obtained.

The water absorbing resin (C) was pulverized with a roll mill and further classified with a JIS standard sieve having an aperture of 710 μm. Then, the particles which had passed the apertures of 710 μm in the foregoing operation were classified with a JIS standard sieve having an aperture of 150 μm to remove the water absorbing resin particles which had passed the JIS standard sieve of an aperture of 150 μm. Thus, a water absorbing resin (C1) was obtained. The water absorbing resin (C1) was rated to determine various properties. As a result of the rating, physical properties shown in Table 1 and the various particle size distributions shown in Table 2 were obtained.

Referential Example 4

In a reaction vessel formed by attaching a stopper to a jacketed stainless steel twin arm type kneader furnished with two sigma type vanes and having an inner volume of 10 liters, 6.04 g of polyethylene glycol diacrylate was dissolved in 5452 g of an aqueous sodium acrylate solution having the monomer concentration of 39 weight % and the neutralization ratio of 90 mol to prepare a reaction solution. Then, this reaction solution was deaerated in an atmosphere of nitrogen gas for 30 minutes. When 19.1 g of an aqueous 10 weight % sodium persulfate solution and 23.9 g of an aqueous 0.1 weight % L-ascorbic acid solution were subsequently added as kept stirred to the reaction solution, polymerization was initiated within about one minute of adding the aqueous solutions. The polymerization was carried out at 20-95° C. while the formed gel was continuously pulverized. After the elapse of 30 minutes subsequent to the start of polymerization, a hydrogel-like cross-linked polymer was taken out. The produced hydrogel-like cross-linked polymer was in a form finely divided into particulates not more than about 5 mm in diameter. This finely divided hydrogel-like cross-linked polymer was spread on a 50-mesh metal gauze (aperture 300 μm) and dried with hot air at 175° C. for 50 minutes. Thus, a water absorbing resin (D) formed of indeterminately shaped, easily pulverizable aggregates of a particulate or powdery dry product was obtained.

The water absorbing resin (D) was pulverized with a roll mill and further classified with a JIS standard sieve having an aperture of 710 μm. Then, the particles which had passed the apertures of 710 μm in the foregoing operation were classified with a JIS standard sieve having an aperture of 150 μm to remove the water absorbing resin particles which had passed the JIS standard sieve of an aperture of 150 μm. Thus, a water absorbing resin (D1) was obtained. The water absorbing resin (D1) was rated to determine various properties. As a result of the rating, physical properties shown in Table 1 and the various particle size distributions shown in Table 2 were obtained.

Referential Example 5

The water absorbing resin (A) described in Referential Example 1 was pulverized with a pin mill and further classified with the JIS sieve having an aperture of 500 μm to remove the water absorbing resin particles which do not pass on the JIS sieve having an aperture of 500 μm. Thus, a water absorbing resin (A2) was obtained. This water absorbing resin (A2) was rated to determine various properties. As a result of the rating, physical properties shown in Table 1 and the various particle size distributions shown in Table 2 were obtained.

Referential Example 6

The water absorbing resin (A) described in Referential Example 1 was pulverized with a pin mill and further classified with the JIS sieve having an aperture of 710 μm to remove the water absorbing resin particles which do not pass on the JIS sieve having an aperture of 710 μm. Thus, a water absorbing resin (A3) was obtained. This water absorbing resin (A3) was rated to determine various properties. As a result of the rating, physical properties shown in Table 1 and the various particle size distributions shown in Table 2 were obtained.

Example 1

Figure 2:
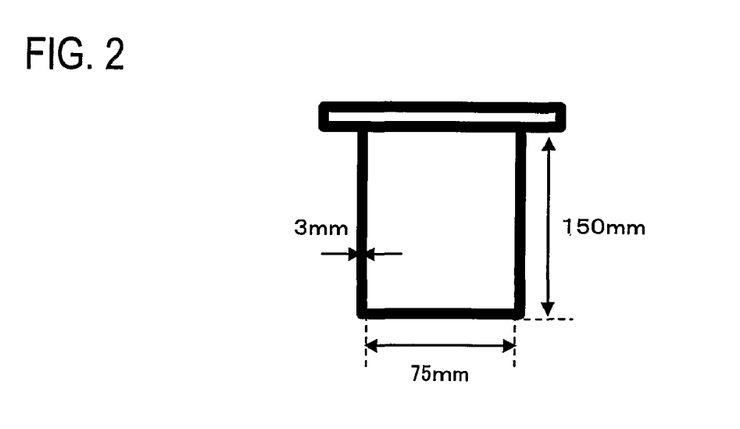
FIG. 2 is a schematic cross section of a separable flask made of quartz and used in the working examples.
Figure 3:
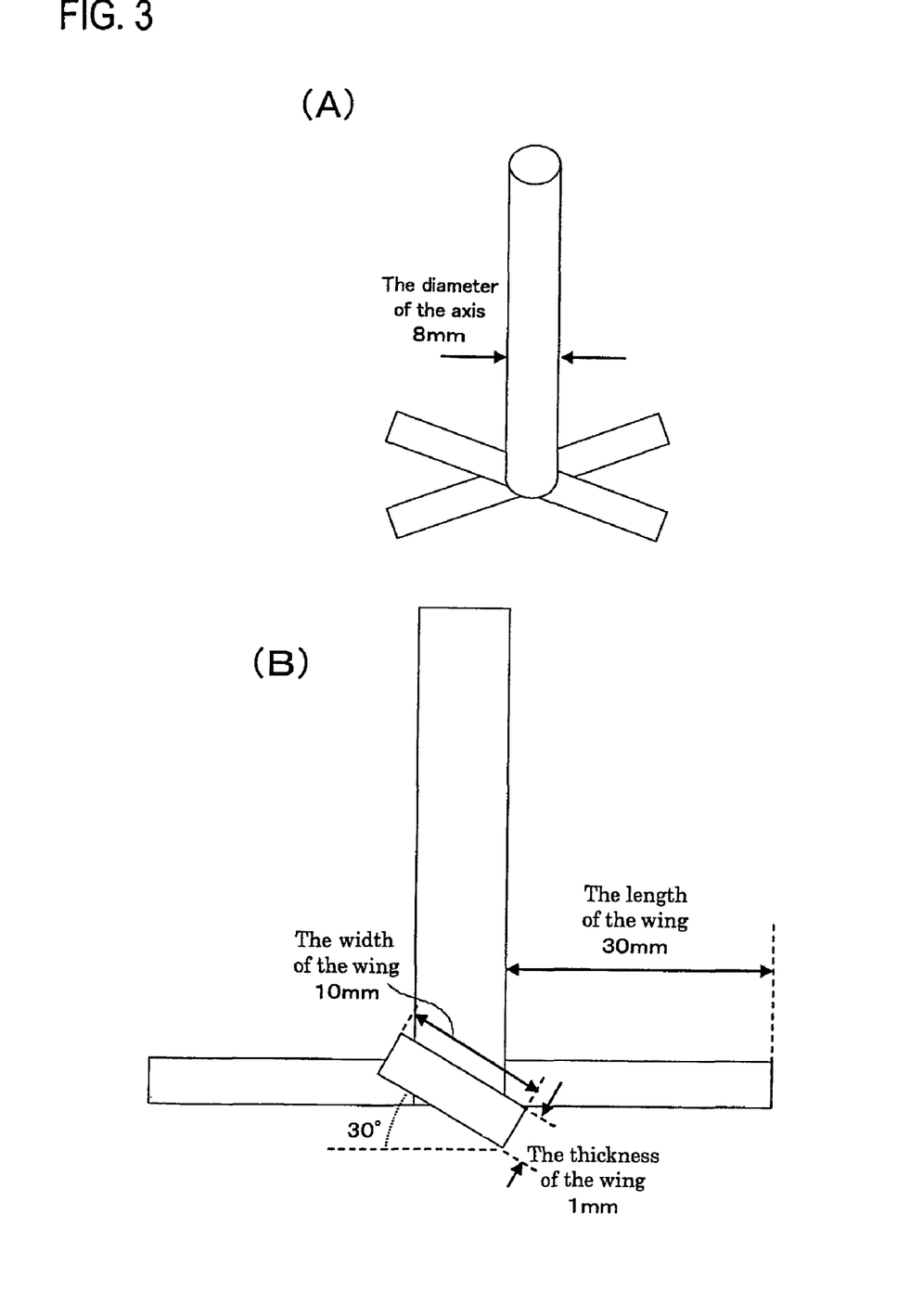
FIG. 3(A) is a perspective view of stirring vanes used in the working examples and FIG. 3(B) is a side view of the stirring vanes used in the working examples.

In a separable flask made of quartz (illustrated in FIG. 2), 10 g of the water absorbing resin (A1) was placed and stirred with stirring vanes (illustrated in FIG. 3) at 500 rpm meanwhile 0.85 g of an aqueous 5.88 weight % polyethylene glycol methyl ether Mn 2000 (PEG-OMe 2000: $CH_3(OCH_2CH_2)_nOH$, number average molecular weight Mn: 20000, made by Aldrich Corp.) solution was added thereto. After the stirring was continued for 10 minutes, the stirred mixture was irradiated with an ultraviolet rays at a radiation intensity of 60 mW/cm$^2$ for 10 minutes at room temperature by using an ultraviolet rays radiating device (made by Ushio Denki K.K. and sold under the product code of "UV-152/IMNSC3-AA06") furnished with a metal halide lamp (made by the same company and sold under the product code of "UVL-1500M2-N1") to obtain a surface-treated water absorbing agent (1).

The conditions for the synthesis of the produced water absorbing agent (1) are shown in Table 3 and the results of the test of this agent for various physical properties are shown in Table 4.

The various physical properties concerning "the water contents of 8 weight % corrected" indicated in Table 4 were the magnitudes calculated in accordance with the following formula.

CRC (g/g) after correction of water content of 8 weight %=(CRC (g/g) with no correction of water content+1)/0.92−1

AAP 0.3 (g/g) after correction of water content of 8 weight %=AAP 0.3 (g/g) with no correction of water content/0.92

Eluted soluble content (weight %) after correction of water content of 8 weight %=Eluted soluble content with no correction of water content (weight %)/0.92

Example 2

A surface-treated water absorbing agent (2) was obtained by following the procedure of Example 1 while using 10 g of the water absorbing resin (B1) instead and changing the rotational frequency of the stirring vanes to 450 rpm. The conditions for the synthesis of the produced water absorbing agent (2) are shown in Table 3 and the results of the test of this agent for various physical properties are shown in Table 4.

Example 3

A surface-treated water absorbing agent (3) was obtained by following the procedure of Example 1 while using 10 g of the water absorbing resin (C1) instead. The conditions for the synthesis of the produced water absorbing agent (3) are shown in Table 3 and the results of the test of this agent for various physical properties are shown in Table 4.

Example 4

A surface-treated water absorbing agent (4) was obtained by following the procedure of Example 1 while using 10 g of the water absorbing resin (D1) instead. The conditions for the synthesis of the produced water absorbing agent (4) are shown in Table 3 and the results of the test of this agent for various physical properties are shown in Table 4.

Example 5

A surface-treated water absorbing agent (5) was obtained by following the procedure of Example 1 while using 0.85 g of an aqueous 5.88 weight % polyethylene glycol methyl ether Mn 550 (PEG-OMe 550: $CH_3 (OCH_2CH_2)_nOH$, number average molecular weight Mn: 550, made by Aldrich Corp.) solution instead and changing the rotational frequency of the stirring vanes to 400 rpm. The conditions for the synthesis of the produced water absorbing agent (5) are shown in Table 3 and the results of the test of this agent for various physical properties are shown in Table 4.

Example 6

A surface-treated water absorbing agent (6) was obtained by following the procedure of Example 1 while using 0.85 g of an aqueous 5.88 weight % polyethylene glycol methyl ether Mn 5000 (PEG-OMe 5000: $CH_3(OCH_2CH_2)_nOH$, number average molecular weight Mn: 5000, made by Aldrich Corp.) solution instead and changing the rotational frequency of the stirring vanes to 400 rpm. The conditions for the synthesis of the produced water absorbing agent (6) are shown in Table 3 and the results of the test of this agent for various physical properties are shown in Table 4.

Example 7

A surface-treated water absorbing agent (7) was obtained by following the procedure of Example 1 while using 0.85 g of an aqueous 5.88 weight % polyethylene glycol Mn 600 (PEG 600:$H(OCH_2CH_2)_nOH$, number average molecular weight Mn: 600, made by Wako Junyaku Kogyo K.K.) solution instead and changing the rotational frequency of the stirring vanes to 600 rpm. The conditions for the synthesis of the produced water absorbing agent (7) are shown in Table 3 and the results of the test of this agent for various physical properties are shown in Table 4.

Example 8

A surface-treated water absorbing agent (8) was obtained by following the procedure of Example 1 while using 0.85 g of an aqueous 5.88 weight % polyethylene glycol Mn 2000 (PEG 200: $H(OCH_2CH_2)_nOH$, number average molecular weight Mn: 2000, made by Wako Junyaku Kogyo K.K.) solution instead and changing the rotational frequency of the stirring vanes to 600 rpm. The conditions for the synthesis of the produced water absorbing agent (8) are shown in Table 3 and the results of the test of this agent for various are shown in Table 4.

Example 9

A surface-treated water absorbing agent (9) was obtained by following the procedure of Example 1 while using 0.85 g of an aqueous 5.88 weight % polyethylene glycol Mn 6000 (PEG 6000: $H(OCH_2CH_2)_nOH$, number average molecular weight Mn: 6000, made by Kishida Kagaku K.K.) solution instead and changing the rotational frequency of the stirring vanes to 600 rpm. The conditions for the synthesis of the produced water absorbing agent (9) are shown in Table 3 and the results of the test of this agent for various physical properties are shown in Table 4.

Comparative Example 1

In a separable flask made of quartz, 10 g of the water absorbing resin (A1) was placed, stirred with stirring vanes at 500 rpm, and irradiated with an ultraviolet rays at a radiation intensity of 60 mW/cm$^2$ for 10 minutes at room temperature by using an ultraviolet rays radiating device (made by Ushio Denki K.K. and sold under the product code of "UV-152/IMNSC3-AA06") furnished with a metal halide lamp (made by the same company and sold under the product code of "UVL-1500M2-N1") to obtain a comparative surface-treated water absorbing agent (1). The conditions for the synthesis of the produced comparative water absorbing agent (1) are shown in Table 3 and the results of the test of this agent for various physical properties are shown in Table 4.

Comparative Example 2

A comparative water absorbing agent (2) was obtained by following the procedure of Comparative Example 1 while using 10 g of the water absorbing resin (B1) instead. The conditions for the synthesis of the produced comparative water absorbing agent (2) are shown in Table 3 and the results of the test of this agent for various physical properties are shown in Table 4.

Comparative Example 3

In a separable flask made of quartz, 10 g of the water absorbing resin (B1) was placed and stirred with stirring vanes at 450 rpm meanwhile 1.30 g of an aqueous 38.5 weight % ammonium persulfate (APS) solution was added thereto. After the stirring was continued for 10 minutes, the stirred mixture was irradiated with an ultraviolet rays at a radiation intensity of 60 mW/cm$^2$ for 10 minutes at room temperature by using an ultraviolet rays radiating device (made by Ushio Denki K.K. and sold under the product code of "UV-152/IMNSC3-AA06") furnished with a metal halide lamp (made by the same company and sold under the product code of "UVL-1500M2-N1") to obtain a comparative surface-treated water absorbing agent (3). The conditions for the synthesis of the produced comparative water absorbing agent (3) are shown in Table 3 and the results of the test of this agent for various physical properties are shown in Table 4.

Comparative Example 4

In a separable flask made of quartz, 10 g of the water absorbing resin (A1) was placed and stirred with stirring vanes at 450 rpm meanwhile 0.80 g of purified water was added thereto. A comparative water absorbing agent (4) was obtained by continuing the stirring for 10 minutes. The conditions for the synthesis of the produced comparative water absorbing agent (4) are shown in Table 3 and the results of the test of this agent for various physical properties are shown in Table 4.

Comparative Example 5

In a separable flask made of quartz, 10 g of the water absorbing resin (A1) was placed and stirred with stirring vanes at 450 rpm meanwhile 0.85 g of an aqueous 5.88 weight % polyethylene glycol methyl ether Mn 2000 ($CH_3$ (OCH$_2$CH$_2$)$_n$OH, number average molecular weight Mn: 2000, made by Aldrich Corp.) solution. A comparative water absorbing agent (5) was obtained by continuing the stirring for 10 minutes. The conditions for the synthesis of the produced comparative water absorbing agent (5) are shown in Table 3 and the results of the test of the agent for various physical properties are shown in Table 4.

Comparative Example 6

A comparative water absorbing agent (6) having surface treated part of the water absorbing resin thereof was obtained by following the procedure of Example 1 while using 0.80 g of a purified water in the place of the aqueous 5.88 weight % polyethylene glycol methyl ether and omitting the rotation with the stirring vanes during the radiation of the ultraviolet rays. The conditions for the synthesis of the produced comparative water absorbing agent (6) are shown in Table 3 and the results of the test of the agent for various physical properties are shown in Table 4.

Comparative Example 7

A comparative water absorbing agent (7) having surface treated part of the water absorbing resin thereof was obtained by following the procedure of Example 1 while omitting the rotation with the stirring vanes during the radiation of the ultraviolet rays. The conditions for the synthesis of the produced comparative water absorbing agent (7) are shown in Table 3 and the results of the test of the agent for various physical properties are shown in Table 4.

Comparative Example 8

In a separable flask made of quartz, 10 g of the water absorbing resin (A2) was placed and stirred with stirring vanes at 450 rpm meanwhile 0.80 g of purified water was added thereto. After the stirring was continued for 10 minutes, the stirred mixture was irradiated with an ultraviolet rays at a radiation intensity of 60 mW/cm$^2$ for 10 minutes at room temperature by using an ultraviolet rays radiating device (made by Ushio Denki K.K. and sold under the product code of "UV-152/IMNSC3-AA06") furnished with a metal halide lamp (made by the same company and sold under the product code of "UVL-1500M2-N1") to obtain a comparative surface-treated water absorbing agent (8). The conditions for the synthesis of the produced comparative water absorbing agent (8) are shown in Table 3 and the results of the test of this agent for various physical properties are shown in Table 4.

Comparative Example 9

A comparative water absorbing agent (9) was obtained by following the procedure of Comparative Example 8 while using 10 g of the water absorbing resin (A3) instead. The conditions for the synthesis of the produced comparative water absorbing agent (9) are shown in Table 3 and the results of the test of this agent for various physical properties are shown in Table 4.

TABLE 1

| Water absorbing resin | Neutralization ratio (mol %) | CRC (g/g) | AAP 0.3 (g/g) | Water content (weight %) | Eluted soluble content (weight %) |
|---|---|---|---|---|---|
| Water absorbing resin (A1) | 60 | 35.1 | 12.6 | 5.7 | 13.3 |
| Water absorbing resin (B1) | 70 | 34.5 | 11.8 | 6.3 | 12.2 |
| Water absorbing resin (C1) | 80 | 32.4 | 14.2 | 5.5 | 6.7 |
| Water absorbing resin (D1) | 90 | 34.6 | 6.6 | 6.1 | 11.4 |
| Water absorbing resin (A2) | 60 | 33.9 | 10.1 | | — |
| Water absorbing resin (A3) | 60 | 34.1 | 10.3 | | — |

TABLE 2

| Referential Example | 1 | 2 | 3 | 4 | 5 | 6 |
|---|---|---|---|---|---|---|
| Water absorbing resin | A1 | B1 | C1 | D1 | A2 | A3 |
| D50 (μm) | 345 | 346 | 322 | 323 | 231 | 242 |
| σζ | 0.327 | 0.332 | 0.359 | 0.339 | 0.413 | 0.472 |
| Particle size distribution | | | | | | |
| Not less than 850 μm (weight %) | 0.0 | 0.0 | 0.0 | 0.0 | 0.0 | 0.0 |
| 850-710 μm (weight %) | 0.1 | 0.2 | 0.0 | 0.0 | 0.0 | 0.0 |
| 710-600 μm (weight %) | 1.0 | 1.5 | 0.0 | 0.0 | 0.0 | 0.8 |
| 600-500 μm (weight %) | 3.7 | 4.1 | 2.7 | 1.9 | 0.0 | 2.3 |
| 500-425 μm (weight %) | 21.7 | 22.6 | 19.2 | 18.8 | 7.1 | 8.8 |
| 425-300 μm (weight %) | 39.6 | 37.1 | 36.2 | 37.8 | 18.9 | 19.4 |
| 300-212 μm (weight %) | 23.0 | 23.9 | 26.6 | 28.1 | 32.4 | 30.7 |
| 212-150 μm (weight %) | 9.3 | 9.3 | 12.6 | 10.3 | 26.7 | 22.5 |
| 150-45 μm (weight %) | 1.5 | 1.3 | 2.6 | 3.1 | 12.6 | 13.1 |
| Not more than 45 μm (weight %) | 0.1 | 0.0 | 0.1 | 0.0 | 2.3 | 2.4 |
| Total (weight %) | 100.0 | 100.0 | 100.0 | 100.0 | 100.0 | 100.0 |

(Not less than A μm) This indicates a water absorbing resin which does not pass a sieve of an aperture of A μm during classification.
(Not more than B μm) This indicates a water absorbing resin passed through a sieve of an aperture of B μm during classification.
(C-D μm) This indicates a water absorbing resin passed through a sieve of an aperture of C μm and does not pass a sieve of an aperture of D μm during classification.

TABLE 3

| Example No. | Water absorbing agent | Additive composition and ratio thereof (weight %) to water absorbing resin (A1-D1) | Surface tension of additive solution (dynes/cm) | Rotational frequency of stirring vanes during radiation of UV (rpm) | Duration of UV radiation |
|---|---|---|---|---|---|
| Example 1 | Water absorbing agent (1) | W*)/PEG-OMe2000 = 8/0.5 | 51.7 | 500 | 10 minutes |
| Example 2 | Water absorbing agent (2) | W*)/PEG-OMe2000 = 8/0.5 | 51.7 | 450 | 10 minutes |
| Example 3 | Water absorbing agent (3) | W*)/PEG-OMe2000 = 8/0.5 | 51.7 | 500 | 10 minutes |
| Example 4 | Water absorbing agent (4) | W*)/PEG-OMe2000 = 8/0.5 | 51.7 | 500 | 10 minutes |
| Example 5 | Water absorbing agent (5) | W*)/PEG-OMe550 = 8/0.5 | | 400 | 10 minutes |
| Example 6 | Water absorbing agent (6) | W*)/PEG-OMe5000 = 8/0.5 | | 400 | 10 minutes |
| Example 7 | Water absorbing agent (7) | W*)/PEG600 = 8/0.5 | | 600 | 10 minutes |
| Example 8 | Water absorbing agent (8) | W*)/PEG2000 = 8/0.5 | | 600 | 10 minutes |
| Example 9 | Water absorbing agent (9) | W*)/PEG6000 = 8/0.5 | | 600 | 10 minutes |
| Comparative Example 1 | Comparative Water absorbing agent (1) | — | | 500 | 10 minutes |
| Comparative Example 2 | Comparative Water absorbing agent (2) | — | | 500 | 10 minutes |
| Comparative Example 3 | Comparative Water absorbing agent (3) | W*)/APS = 8/5 | | 450 | 10 minutes |
| Comparative Example 4 | Comparative Water absorbing agent (4) | W*) = 8 | 73 | | |
| Comparative Example 5 | Comparative Water absorbing agent (5) | W*)/PEG-OMe2000 = 8/0.5 | 51.7 | | |
| Comparative Example 6 | Comparative Water absorbing agent (6) | W*) = 8 | 73 | 0 | 10 minutes |
| Comparative Example 7 | Comparative Water absorbing agent (7) | W*)/PEG-OMe2000 = 8/0.5 | 51.7 | 0 | 10 minutes |
| Comparative Example 8 | Comparative Water absorbing agent (8) | W*) = 8 | 73 | 500 | 10 minutes |
| Comparative Example 9 | Comparative Water absorbing agent (9) | W*) = 8 | 73 | 500 | 10 minutes |

*)W: purified water

TABLE 4

| | | Water content not corrected | | | Water content of 8 weight % corrected** | | |
|---|---|---|---|---|---|---|---|
| Example No. | Water absorbing agent | CRC (g/g) | AAP 0.3 (g/g) | Eluted soluble content (weight %) | CRC (g/g) | AAP 0.3 (g/g) | Eluted soluble content (weight %) |
| Example 1 | Water absorbing agent (1) | 32.5 | 27.8 | 12.8 | 35.4 | 30.2 | 14.0 |
| Example 2 | Water absorbing agent (2) | 31.6 | 26.5 | 11.8 | 34.4 | 28.8 | 12.8 |
| Example 3 | Water absorbing agent (3) | 28.8 | 25.4 | — | 31.4 | 27.6 | — |
| Example 4 | Water absorbing agent (4) | 32.3 | 18.6 | — | 35.2 | 20.2 | — |
| Example 5 | Water absorbing agent (5) | 32.5 | 28.8 | — | 35.7 | 31.3 | — |
| Example 6 | Water absorbing agent (6) | 31.9 | 27.1 | — | 34.8 | 29.5 | — |

TABLE 4-continued

| | | Water content not corrected | | | Water content of 8 weight % corrected** | | |
|---|---|---|---|---|---|---|---|
| Example No. | Water absorbing agent | CRC (g/g) | AAP 0.3 (g/g) | Eluted soluble content (weight %) | CRC (g/g) | AAP 0.3 (g/g) | Eluted soluble content (weight %) |
| Example 7 | Water absorbing agent (7) | 32.9 | 28.2 | — | 35.8 | 30.7 | — |
| Example 8 | Water absorbing agent (8) | 33 | 28.0 | — | 36.0 | 30.4 | — |
| Example 9 | Water absorbing agent (9) | 32.1 | 27.0 | — | 35.0 | 29.3 | — |
| Comparative Example 1 | Comparative Water absorbing agent (1) | 37.6 | 9.6 | 15.6 | — | — | — |
| Comparative Example 2 | Comparative Water absorbing agent (2) | 36.1 | 8.2 | 13.5 | — | — | — |
| Comparative Example 3 | Comparative Water absorbing agent (3) | 24.0 | 26.1 | | 26.2 | 28.4 | |
| Comparative Example 4 | Comparative Water absorbing agent (4) | 32.7 | 11.9 | | 35.6 | 12.9 | |
| Comparative Example 5 | Comparative Water absorbing agent (5) | 33.4 | 11.5 | | 36.4 | 12.5 | |
| Comparative Example 6 | Comparative Water absorbing agent (6) | 32.7 | 14.2 | | 35.6 | 15.4 | |
| Comparative Example 7 | Comparative Water absorbing agent (7) | 32.2 | 14.8 | | 35.1 | 16.1 | |
| Comparative Example 8 | Comparative Water absorbing agent (8) | 31.6 | 14.1 | — | 34.3 | 15.3 | — |
| Comparative Example 9 | Comparative Water absorbing agent (9) | 31.2 | 14.8 | — | 33.9 | 15.7 | — |

**Water content corrected: Water content of water absorbing resin as determined, and water content of water absorbing agent is corrected by the weight of added water (8 weight %).

The above Examples are to more specifically explain the present invention, and the present invention should not be construed to be limited to the Examples.

This invention, in modifying a water absorbing resin, is capable of giving to the resin a satisfactory surface treatment even at a reaction temperature in the neighborhood of room temperature. The water absorbing agent consequently obtained excels in water absorption properties and, therefore, is industrially useful as evinced by being utilized as for disposable diapers.

The present application is based on Japanese Patent Application No. 2005-270761 filed on Sep. 16, 2005, the disclosure thereof is incorporated herein in entirety by reference.

The invention claimed is:

1. A method for the production of a water absorbing agent, comprising
a) a step of mixing a water absorbing resin, water, and a mixing aid without adding a water-soluble radical polymerization initiator and an ethylenically unsaturated monomer and
b) a step of irradiating the resultant mixture with ultraviolet rays while keeping the mixture in a flowing state.

2. A method according to claim 1, wherein the amount of the water to be mixed is not less than 1 weight part and less than 50 weight parts based on 100 weight parts of the water absorbing resin.

3. A method according to claim 1, wherein the mixing aid is at least one compound selected from the group consisting of surfactants, water-soluble polymer, hydrophilic organic solvents, water-soluble inorganic compounds, inorganic acid salts, and organic acid salts.

4. A method according to claim 1, wherein the mixing aid is added in an amount not less than 0.01 weight parts and less than 50 weight parts, based on 100 parts by weight of the water absorbent resin.

5. A method according to claim 1, wherein the mixing aid is mixed in the form of an aqueous solution with the water absorbing resin.

6. A method according to claim 5, wherein the aqueous solution has a surface tension in the range of 40 dynes/cm-75 dynes/cm.

7. A method according to claim 3, wherein the surfactant is polyoxyethylene alkyl ether.

8. A method according to claim 3, wherein the surfactant is polyethylene glycol.

9. A method according to claim 3, wherein the water-soluble inorganic compound is a water-soluble metal salt.

10. A method according to claim 1, wherein the water absorbing resin contains particles of a particle diameter of not less than 150 μm and less than 850 μm in a ratio amount in the range of 90 weight %-100 weight % of all the particles therein and has a weight average particle diameter (D50) of not less than 300 µm and less than 500 µm and a logarithmic standard deviation (σς) of particle distribution in the range of 0.20-0.45.

11. A method according to claim 1, wherein the absorbency of physiological saline against pressure of 2.07 kPa of the water absorbing agent is not less than 15 g/g and less than 50 g/g and is exalted by at least 1 g/g comparing with that of the water absorbing resin.

12. A method according to claim 1, wherein the water absorbent resin has an acid group and a neutralization ratio (mol % of the neutralized acid group in the whole acid group) in the range of 50-95 mol %.

13. A method according to claim 1, wherein the eluted soluble content of the water absorbing agent is not less than 0.1 weight parts and less than 30 weight parts, based on 100 weight parts of the water absorbing resin.

14. A method according to claim 1, wherein the irradiation with the ultraviolet rays is carried out under application of heat.

15. A method according to claim 1, wherein the water absorbing resin is obtained by polymerizing a monomer having acrylic acid (salt) as a main component thereof.

16. A method according to claim 1, wherein the water absorbing resin is obtained by preparing a water absorbing resin precursor having a low neutralization ratio and mixing the water absorbing resin precursor with a base.

17. A method according to claim 2, wherein the mixing aid is at least one compound selected from the group consisting of surfactants, water-soluble polymer, hydrophilic organic solvents, water-soluble inorganic compounds, inorganic acid salts, and organic acid salts.

18. A method according to claim 2, wherein the mixing aid is added in an amount not less than 0.01 weight parts and less than 50 weight parts, based on 100 parts by weight of the water absorbent resin.

19. A method according to claim 3, wherein the mixing aid is added in an amount not less than 0.01 weight parts and less than 50 weight parts, based on 100 parts by weight of the water absorbent resin.

20. A method according to claim 2, wherein the mixing aid is mixed in the form of an aqueous solution with the water absorbing resin.

21. A method according to claim 3, wherein the mixing aid is mixed in the form of an aqueous solution with the water absorbing resin.

* * * * *